(12) United States Patent
Fager

(10) Patent No.: US 11,412,896 B1
(45) Date of Patent: Aug. 16, 2022

(54) SALAD KIT

(71) Applicant: PLASTIC INGENUITY, INC., Cross Plains, WI (US)

(72) Inventor: Mark Fager, Madison, WI (US)

(73) Assignee: Plastic Ingenuity, Inc., Cross Plains, WI (US)

( * ) Notice: Subject to any disclaimer, the term of this patent is extended or adjusted under 35 U.S.C. 154(b) by 50 days.

(21) Appl. No.: 16/876,039

(22) Filed: May 16, 2020

Related U.S. Application Data

(60) Provisional application No. 62/848,617, filed on May 16, 2019.

(51) Int. Cl.
 *A47J 47/10* (2006.01)
 *A47G 19/03* (2006.01)
 *A47G 23/06* (2006.01)

(52) U.S. Cl.
 CPC .............. *A47J 47/10* (2013.01); *A47G 19/03* (2013.01); *A47G 23/06* (2013.01); *A47G 2400/06* (2013.01)

(58) Field of Classification Search
 CPC ......... A47J 47/10; A47G 19/03; A47G 23/06; A47G 2400/06
 See application file for complete search history.

(56) References Cited

U.S. PATENT DOCUMENTS

| | | | |
|---|---|---|---|
| 4,058,214 A * | 11/1977 | Mancuso | B65D 81/3816 206/545 |
| D426,110 S | 6/2000 | Schmidt | |
| 6,129,232 A * | 10/2000 | Williams | A47G 23/06 220/23.83 |
| D615,821 S | 5/2010 | Stamper | |
| D640,571 S | 6/2011 | Landry | |
| D649,068 S | 11/2011 | Breton et al. | |
| D698,665 S | 2/2014 | Sifuentes et al. | |
| D698,666 S | 2/2014 | Sifuentes et al. | |
| D723,392 S | 3/2015 | Siufentes et al. | |
| D728,383 S | 5/2015 | Sifuentes et al. | |
| D729,588 S | 5/2015 | Breton | |
| D734,098 S | 7/2015 | Breton | |
| D737,633 S | 9/2015 | Breton | |
| D740,615 S | 10/2015 | Shoshan et al. | |
| D745,807 S | 12/2015 | Harris et al. | |
| D766,736 S | 9/2016 | Shoshan | |
| D769,732 S | 10/2016 | Shoshan | |
| D772,078 S | 11/2016 | Shoshan et al. | |
| D782,333 S | 3/2017 | Shoshan et al. | |
| D802,368 S | 11/2017 | Peng | |
| D804,961 S | 12/2017 | Shoshan et al. | |
| D809,934 S | 2/2018 | Shoshan et al. | |
| D829,509 S | 10/2018 | Malak | |
| D850,935 S | 6/2019 | Dominion et al. | |
| D851,501 S | 6/2019 | Dominion et al. | |
| D861,500 S | 10/2019 | Dominion et al. | |
| D862,249 S | 10/2019 | Dominion | |

* cited by examiner

*Primary Examiner* — Andrew T Kirsch

(74) *Attorney, Agent, or Firm* — Rick L. Abegglen

(57) ABSTRACT

A thermoformed salad kit with a bowl containing salad greens, and a tray containing fixings and dressing. The tray can be mounted on the bowl in one orientation to form a vented container offered for sale, and then inverted and mounted on the bowl in a second orientation to form a sealed container for mixing of the salad by the end consumer.

17 Claims, 20 Drawing Sheets ated features for initial pre-sale storage as separate components (salad greens, fixings, and salad dressing), subsequent assembly as a particular combination at point of sale, and final mixing for consumption by the end consumer, where each of these steps may be performed at different times and by different persons.

SALAD KIT

CROSS-REFERENCE TO RELATED APPLICATIONS

This application claims priority to provisional application No. 62/848,617, filed May 16, 2019, the disclosure of which is incorporated by reference.

FIELD OF THE INVENTION

This invention relates generally to the field of containers. More particularly, the present invention relates to thermoformed containers adapted for use as a salad kit with enhanced features for initial pre-sale storage as separate components (salad greens, fixings, and salad dressing), subsequent assembly as a particular combination at point of sale, and final mixing for consumption by the end consumer, where each of these steps may be performed at different times and by different persons.

BACKGROUND OF THE INVENTION

Consumers demand food that is convenient to prepare and eat, if not ready-to-eat, while at the same time customized for their own particular tastes. Fresh salad, in particular, presents unique challenges and requirements. For example, fresh salad typically contains salad greens, along with salad dressing and one or more "fixings". The fixings might be, for example, croutons, fresh vegetables, meat or other protein, fruit, or nuts, depending on the tastes of a particular consumer. Consumers like to pick and choose to suit their own particular tastes and they like the mouth feel of crisp vegetables and crunchy croutons that comes in a freshly-mixed salad.

Assembly and delivery of a customizable and freshly-mixed salad to a consumer presents certain logistical issues.

One logistical issue is that salad greens, salad dressing, and fixings may have very different shelf lives. Often the salad greens will have the shortest shelf life. The fixings, depending on their nature, will have an intermediate shelf life, with meat having the shortest and things like nuts having longer. Sealed portions of salad dressing may have the longest shelf life, compared to fixings and salad greens. Once the salad greens, fixings, and dressing are packaged together for retail sale, the shelf life on the entire combination becomes the shelf life of the soonest-to-expire component.

Another practical issue is that of inventory levels that are adequate and available to meet immediate sale requirements. Consumers demand variety, and want to choose their salad greens, fixings, and salad dressing independently. Every different particular combination of salad greens, fixings, and salad dressing creates a unique salad kit that must be inventoried. Not only must there be a sufficient quantity of inventory, that inventory must be made up of the right product mix, to meet the changing needs and tastes of consumers at any given time. Consumer demand may vary widely at any given time for a particular unique salad kit, making it difficult to implement optimal levels of inventory that are not too small (resulting in lost sales) or too large (resulting in spoilage).

The damage caused by insufficient inventory goes straight to the sales bottom line. A customer who cannot buy because their preferred salad kit combination is out of stock may shop elsewhere, a loss of the immediate sale never to be made up. The lost sale is even more damaging if consumers begin to view their retail source as unreliable, eroding customer goodwill and causing sales to drop off. Insufficient stock can be a real problem for a retail store.

A final problem is that of final preparation and mixing by the consumer for eating. In retail sales of takeout or ready-to-eat foods, consumers expect to receive everything needed. Even when sold for use in a meal at home, consumers may prefer to avoid doing any more dishes than needed, for example as may be required to mix a salad the usual way in a large bowl with utensils.

Thermoformed plastic containers are well known as inexpensive and highly customizable containers for the sale of a wide variety of products, ranging from cell phones to deli meats. Thermoformed plastic containers are typically transparent and rigid, so they can give a consumer the ability to examine a product closely without actually touching it. They can be made tamper-resistant, to reduce the risk that the product could be damaged or contaminated. They are typically lightweight, and can be efficiently stored or shipped together in a nested fashion.

What is needed is a thermoformed container that is specially adapted with enhanced features to overcome disadvantages of the prior art, for example to improve shelf life and inventory management of salad components, to provide a salad kit for ready-to-eat use that enables point-of-use mixing without the need for additional utensils or dishes, and that can reduce the need to wash dishes when preparing a mixed salad sold as takeout and consumed at home.

SUMMARY OF THE INVENTION

A salad kit and method according to the invention allows separate storage of the components (salad greens, fixings, and salad dressing), assembly of the components just before retail sale into a finished salad kit sold in a vented container, and convenient mixing by the end consumer in the same salad kit transformed into a sealed container.

In a preferred embodiment, a salad kit according to the invention can be made as a bowl (for example to hold salad greens) and a tray with cavities (for example to hold salad fixings and salad dressing), wherein the bowl has a wall with a bowl side support protrusion and a bowl side vent section, and the tray edge has a tray side cutout and a tray edge support portion. The tray is mounted on the bowl in a first orientation ("right side up" with the concave cavities pointed up) so the tray and bowl together form a vented container. In the vented condition, the tray side cutout is adjacent to the bowl side vent portion (forming a vent) and the tray edge support portion is adjacent to the bowl side support protrusion (so the tray is supported on top of the bowl side support protrusion).

The tray is mounted on the bowl in a second orientation ("upside down" with the concave cavities pointed down so the "fixings" tend to fall into the bowl) so the tray and bowl together form a substantially sealed container. In the sealed condition, the tray side cutout nests with the bowl side support protrusion (eliminating the vent) and the tray edge support portion nests with the bowl side vent portion, to form a substantially sealed container.

In a preferred embodiment, when the tray is mounted on the bowl in the first orientation, the tray outside flange is adjacent to the bowl's upper peripheral support shelf with the tray edge outer wall extending away from the bowl cavity, and in the second orientation the tray outside flange is adjacent to the bowl's upper peripheral support shelf with the tray edge outer wall extending toward the bowl cavity and the tray edge top surface adjacent to the bowl's lower peripheral support shelf whereby the tray and bowl form a substantially sealed container for mixing.

The bowl may include at least one bowl support corner and at least one bowl vent corner, and the tray may contain at least one tray edge support corner and at least one tray edge corner cutout, whereby the tray edge support corner is adjacent to the bowl support corner and the bowl vent corner is adjacent to the tray edge corner cutout (forming a corner vent) when the tray is mounted on the bowl in the first orientation, and whereby the tray edge support corner is adjacent to the bowl vent corner and the bowl support corner is adjacent to the tray edge corner cutout when the tray is mounted on the bowl in the second orientation (eliminating the corner vent).

The rim of the bowl may have an inner wall extending from the rim top surface to the upper peripheral support shelf, with the bowl rim inner wall having one or more bumps, and the tray edge may have a flange, whereby the tray outside flange nests underneath and interferes with the bumps on the inner wall of the bowl rim to retain the tray on the bowl when the tray is mounted on the bowl in the first orientation.

The tray may have various compartments adapted to hold fixings and salad dressing, in bulk or packaged form. The salad greens, fixings, tray, bowl, and salad dressing can all be stored separately before assembly into particular combinations in finished form for retail sale with the tray mounted on the bowl in the first orientation. Alternatively, a tray with fixings and salad dressing can be stored as a sub-assembly, and then combined with salad greens and bowl to form particular combinations.

After purchase, the consumer can flip the tray to deposit the fixings and salad dressing into the bowl with the salad greens, then the tray can be mounted on the bowl in the second orientation for mixing without requiring any additional dishes or utensils.

A first embodiment of the invention is a thermoformed package for use as a salad kit comprising a bowl and a tray, where the tray is mountable on the bowl in a first orientation to form a vented container and the tray is mountable on the bowl in a second orientation to form a substantially sealed container.

A second embodiment of the invention is a method of retail sales of salad kits, comprising the steps of providing a thermoformed package for use as a salad kit comprising a bowl and a tray, placing salad greens in the bowl, placing salad fixings and dressing in the tray, mounting the tray on the bowl in a first orientation to form a vented container offered for sale to a consumer who mounts the tray on the bowl in a second orientation to form a substantially sealed container for mixing the salad.

A third embodiment of the invention is a salad kit, comprising a thermoformed package for use as a salad kit comprising a bowl and a tray, where the tray is mountable on the bowl in a first orientation to form a vented container and the tray is mountable on the bowl in a second orientation to form a substantially sealed container, salad greens, salad fixings, and salad dressing.

A salad kit and method according to the invention lets a food retailer package fixings together, and then combine the packaged fixings with salad greens at point of purchase. After purchase, consumers can mix salads themselves, just before consumption, so they can pick and choose the fixings they want, and tailor how they handle the dressing. A salad kit and method according to the invention can deliver a highly customizable freshly mixed salad as if prepared at a salad bar, with reduced sogginess of the salad greens and improved mouth feel of the fixings compared to a mixed salad that has been sitting around a while. A salad kit and method can also enable improved inventory management, with premade fixings trays, prepackaged dressing, and salad greens assembled at point of sale, to decouple shelf lives of these components and reduce inventory required to meet consumer demand.

Further objects, features, and advantages of the invention will be apparent from the following detailed description when taken in conjunction with the accompanying drawings.

DETAILED DESCRIPTION OF THE INVENTION

Figure 1:
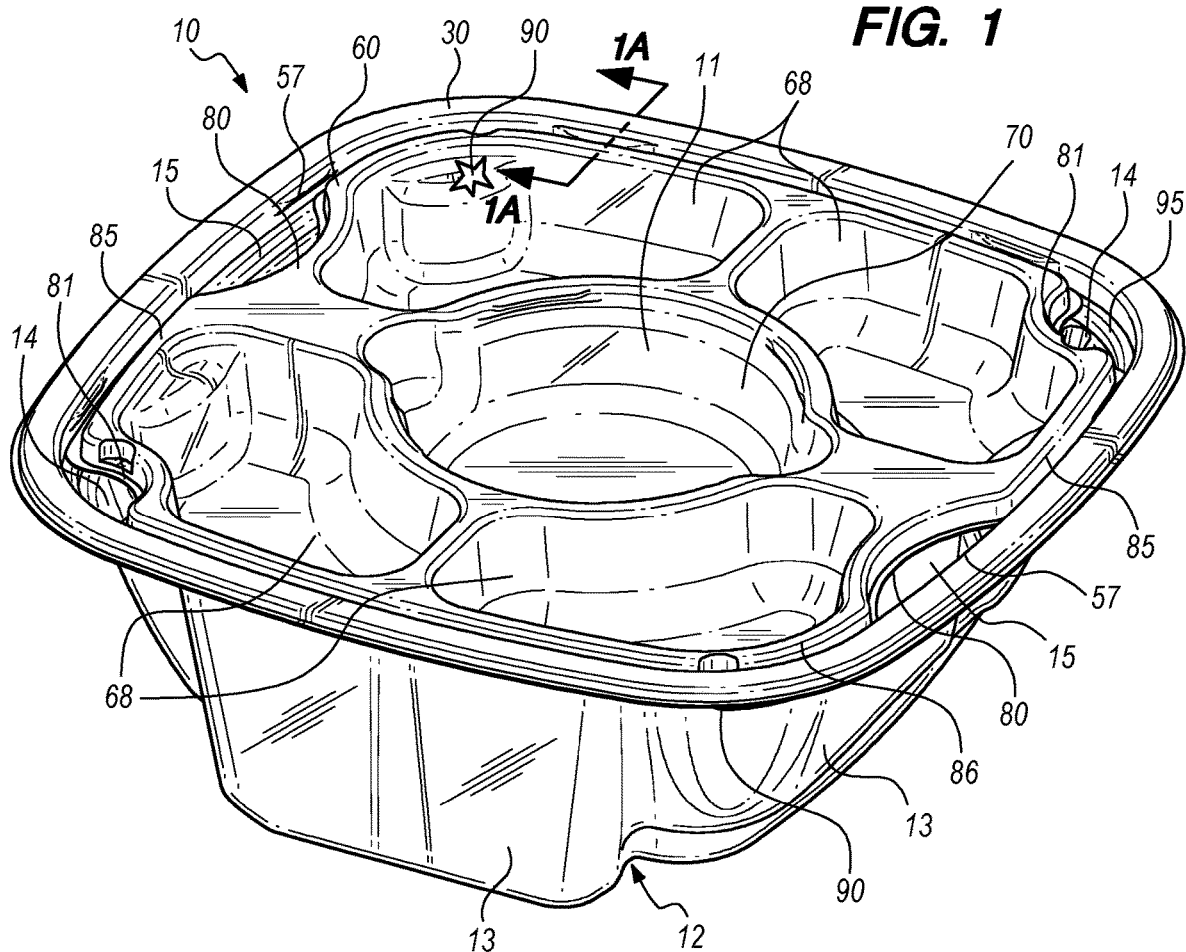
FIG. 1 is a top perspective view of an exemplary salad kit container according to the invention, with the tray mounted on the bowl in the first orientation, or "vent" position.

FIGS. 1-7 show an exemplary salad kit container according to the invention, the "vented salad container 10" comprising a tray 60 and a bowl 30 with the tray 60 mounted on the bowl 30 in a first position, the so-called "vent position". The tray 60 and bowl 30 can each be made of transparent or opaque sheet material, for example using a thermoformable plastic and a vacuum thermoforming process. For brevity, the vented salad container 10 may be referred to alternatively herein as the "vented container 10", or as being in so-called "vent condition" or "vented". As shown in FIGS. 1-7 the vented salad container 10 has a top 11, a bottom 12, one or more walls 13, and at least one vent, such as a corner vent 14 and/or a side vent 15.

In contrast, FIGS. 21-26, discussed in more detail below, show a sealed salad kit container 110 comprising the same tray 60 and the same bowl 30, but with the tray mounted on the bowl 30 in a second position, the so-called "mix position". For brevity, the sealed salad container 110 may be referred to alternatively herein as the "sealed container 110", or as being in so-called "mix condition", "sealed", "ready for shaking", or "ready for mixing". The vented salad container 10 might be offered at point of purchase to a consumer, while the sealed salad container 110 might be used to mix the salad together before eating.

FIGS. 8-13 show an exemplary tray 60 for use in the vented salad container 10 and/or sealed salad container 110. The tray 60 has a perimeter with a tray outside flange 61, a tray edge outer wall 62, a tray edge top surface outer edge 63, tray edge top surface 64, and a tray edge inner wall portion 65. The interior of the tray 60 includes a tray central portion 66 with a tray central portion surface 67, which contains one or more tray cavities 68, each with a tray cavity border 69.

Figure 27:
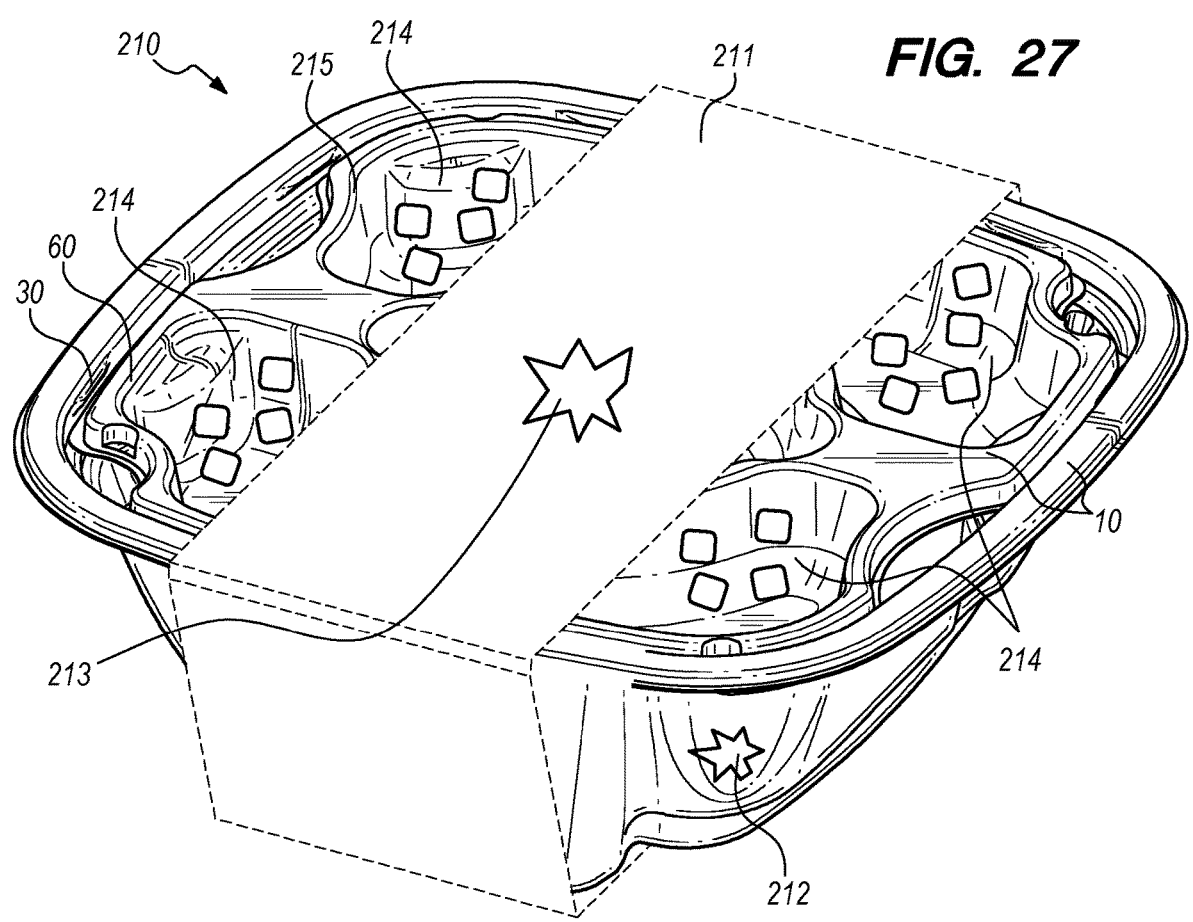
FIG. 27 is a front elevation of the salad kit container in vent position of FIGS. 1-4 loaded with salad greens, salad dressing, and fixings and ready for retail sale.

The tray cavities 68 may, but are not required to, include at least one dressing cavity 70 with a dressing cavity floor 71, a dressing cavity first wall 72, a dressing cavity shelf 73, a dressing cavity second wall 74, a dressing cavity second wall bump 75, and a dressing cavity pry recess 76. As shown in FIG. 27, the dressing cavity 70 can be shaped to receive a prepackaged dressing cup with a peripheral flange, with the peripheral flange of the dressing cup positioned against the dressing cavity shelf 73 to recess the dressing cup in the dressing cavity 70. An end consumer can insert their finger into the dressing cavity pry recess 76 in order to remove the dressing cup from its recessed position in the dressing cavity. Instead of using a prepacked dressing cup, dressing could be poured directly into the dressing cavity 70 and then sealed with transparent film to retain the dressing in the dressing cavity 70.

The tray cavities 68 may, but are not required to, include at least one fixings cavity 77, with a fixings cavity floor 78, and fixings cavity wall 79. As shown in FIG. 27, the tray cavities 68 may be filled with salad fixings 214 and covered with a transparent film 215 to seal the fixings in the tray cavities 68.

The tray 60 may include a tray side cutout 80, a tray edge corner cutout 81, a tray corner support indent shelf 82, a tray corner support indent wall 83, a tray side recess 84, a tray edge support portion 85, and a tray support corner 86.

FIGS. 14-20 show an exemplary bowl 30 for use in the vented salad container 10 and/or sealed salad container 110. The bowl 30 has a central cavity 32, a floor 33, a front wall 34, a rear wall 35, a left wall 36, and a right wall 37. However, this particular combination of walls is not required, and a different shape (such as circular or oval) could be used. The bowl 30 may include a floor rib 38 and/or a wall rib 39, for example for structural rigidity or to provide structure to raise contents off the floor 33.

The bowl 30 has a bowl periphery 40, with a bowl rim outside flange 41, a bowl rim outer wall 42, a bowl rim top outer edge 43, a bowl rim top surface 44, a bowl rim top inner edge 45, a bowl rim inner wall 46, and a bowl rim inner wall bump 47.

The bowl 30 includes a upper peripheral support shelf 50, (referred to alternatively herein as the "vent shelf 50"), as well as a peripheral sealing wall 51 and a lower peripheral support shelf 52 (referred to alternatively herein as the "mixing shelf 52").

The bowl 30 has a side support protrusion 53, with a side support protrusion upper shelf 54, a side support sealing wall 55, a side support protrusion lower shelf 56, and a bowl side vent section 57.

The bowl 30 has a support corner 90 with a support corner upper support shelf 91, a support corner wall 92, a support corner protrusion shelf dent 93, and a support corner lower sealing shelf 94. The bowl 30 has a vent corner 95 with a vent corner wall 96 and a vent corner lower sealing shelf 97. As perhaps best shown in FIG. 14, the support corner 90 is preferably formed with a support corner protrusion shelf dent 93, as a concave recess to allow the consumer to pry underneath the tray when mounted in the sealed condition.

Figure 1A:
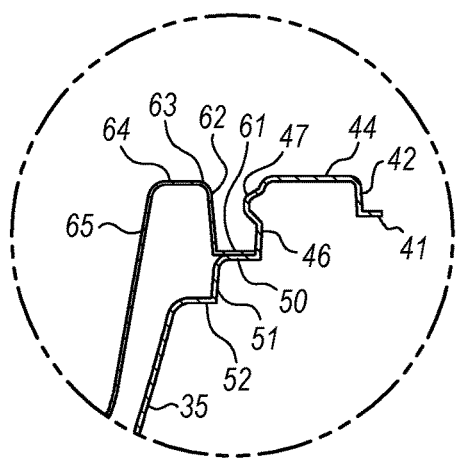
FIG. 1A is a cross-section taken along the line 1A-1A in FIG. 1.
Figure 2:
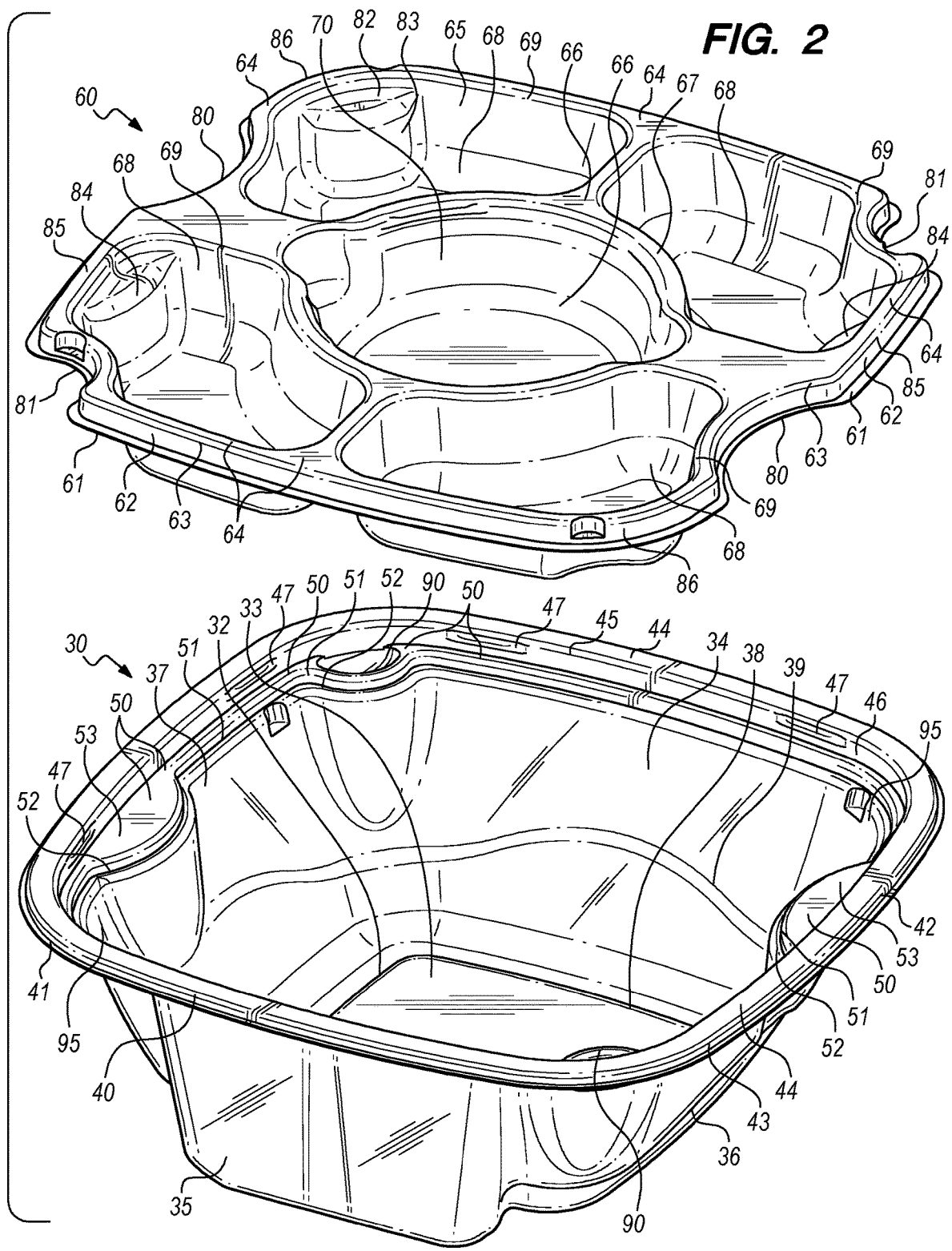
FIG. 2 is a top perspective view of the salad kit container of FIG. 1 with the tray in the vent position and exploded from the base.
Figure 3:
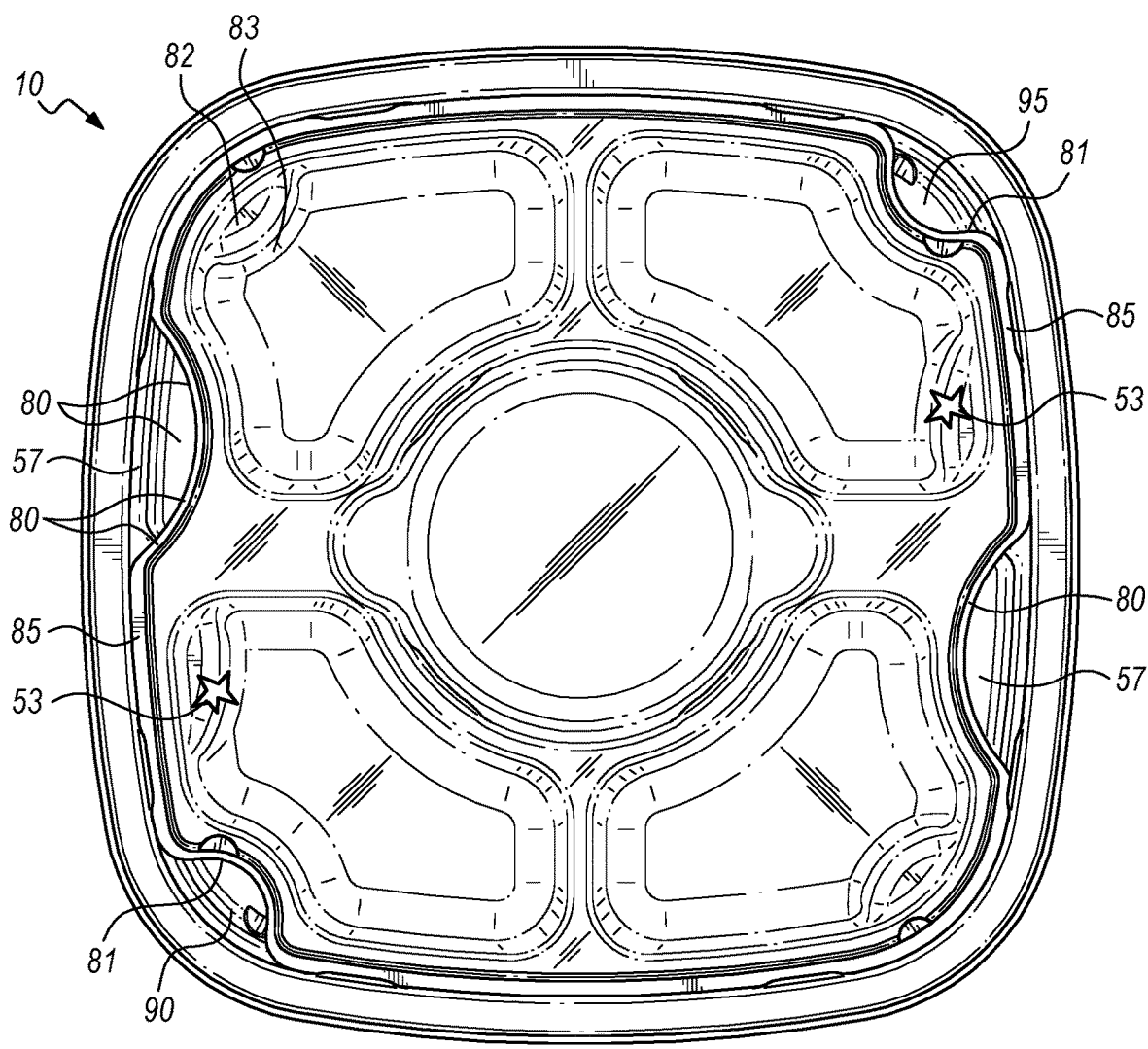
FIG. 3 is a top plan view of the salad kit container in vent position of FIG. 1.
Figure 4:
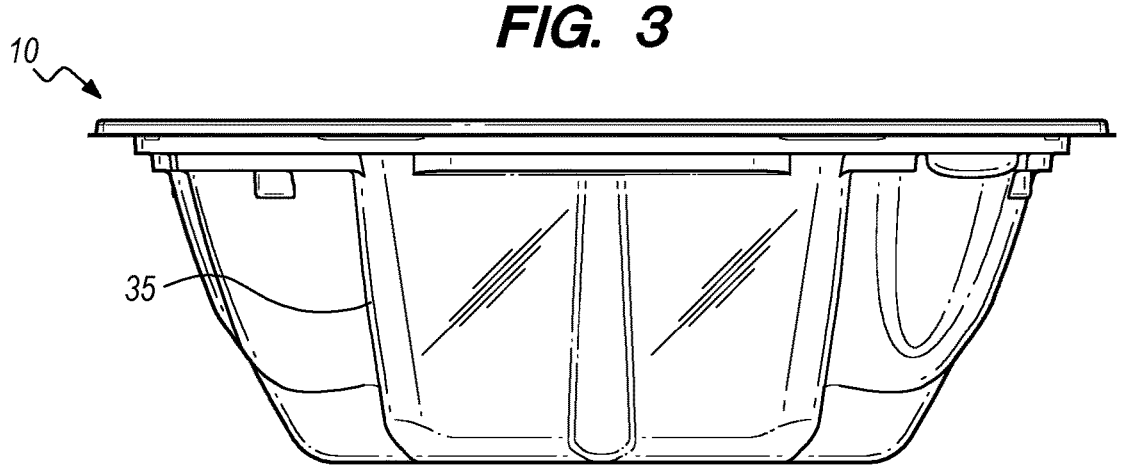
FIG. 4 is a rear elevation view of the salad kit container in vent position of FIG. 1.
Figure 5:
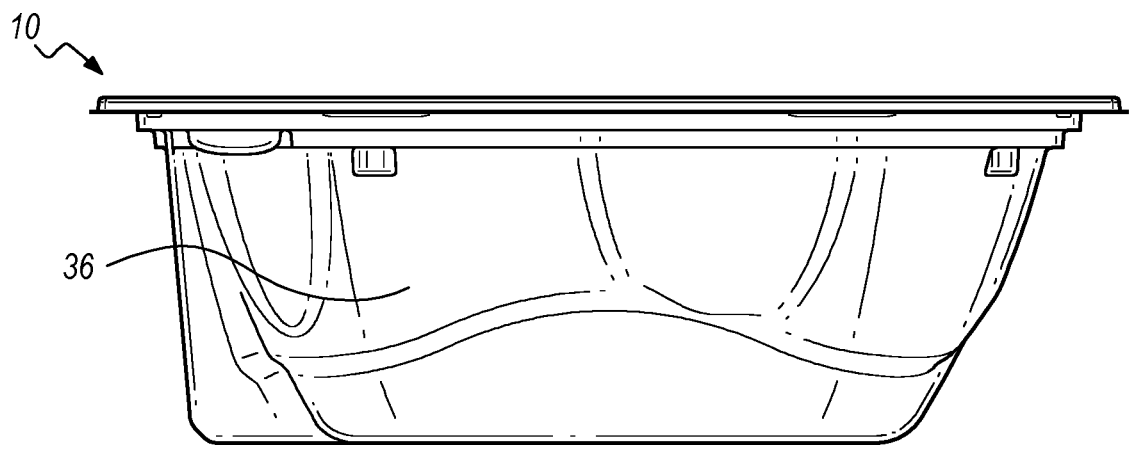
FIG. 5 is a left elevation view of the salad kit container in vent position of FIG. 1.
Figure 6:
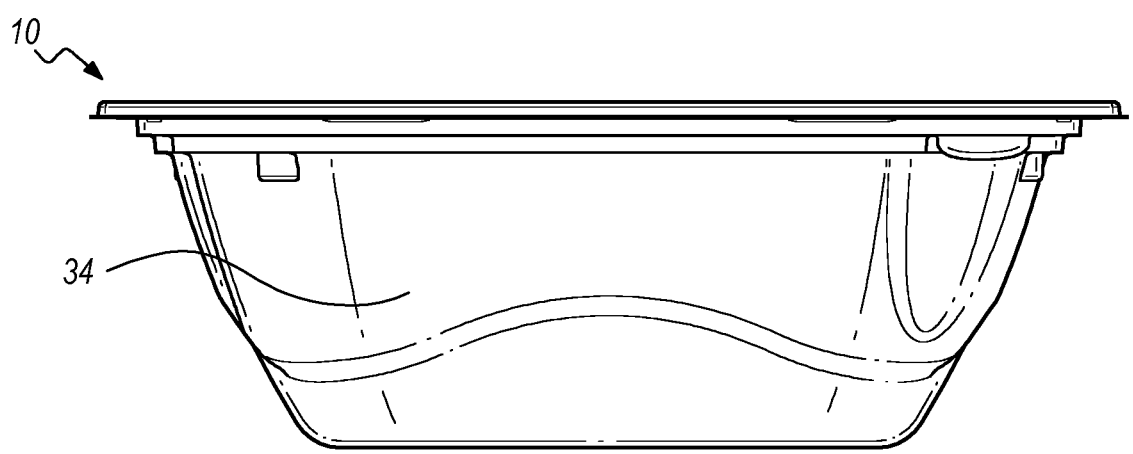
FIG. 6 is a front elevation view of the salad kit container in vent position of FIG. 1.
Figure 7:
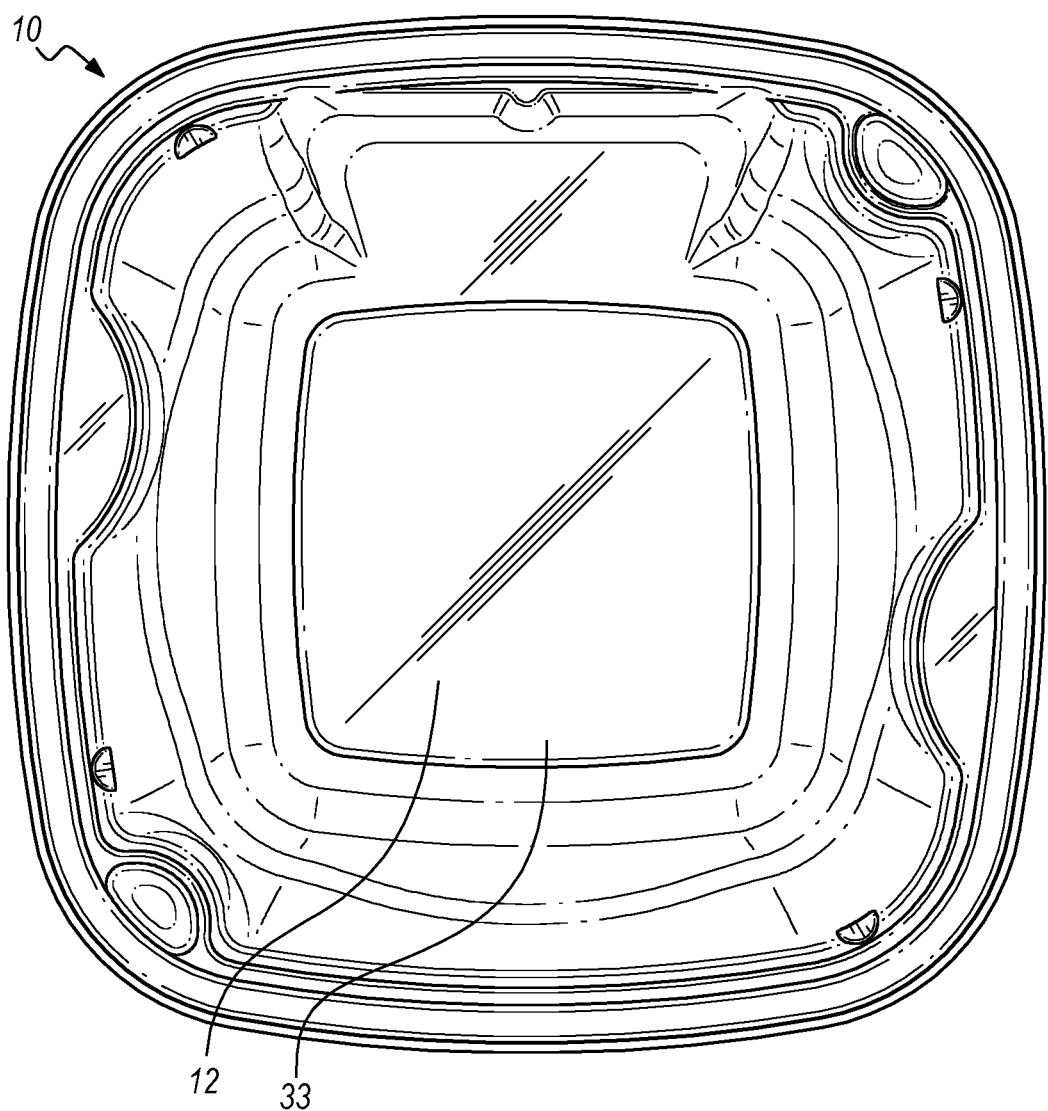
FIG. 7 is a bottom plan view of the salad kit container in vent position of FIG. 1.
Figure 8:
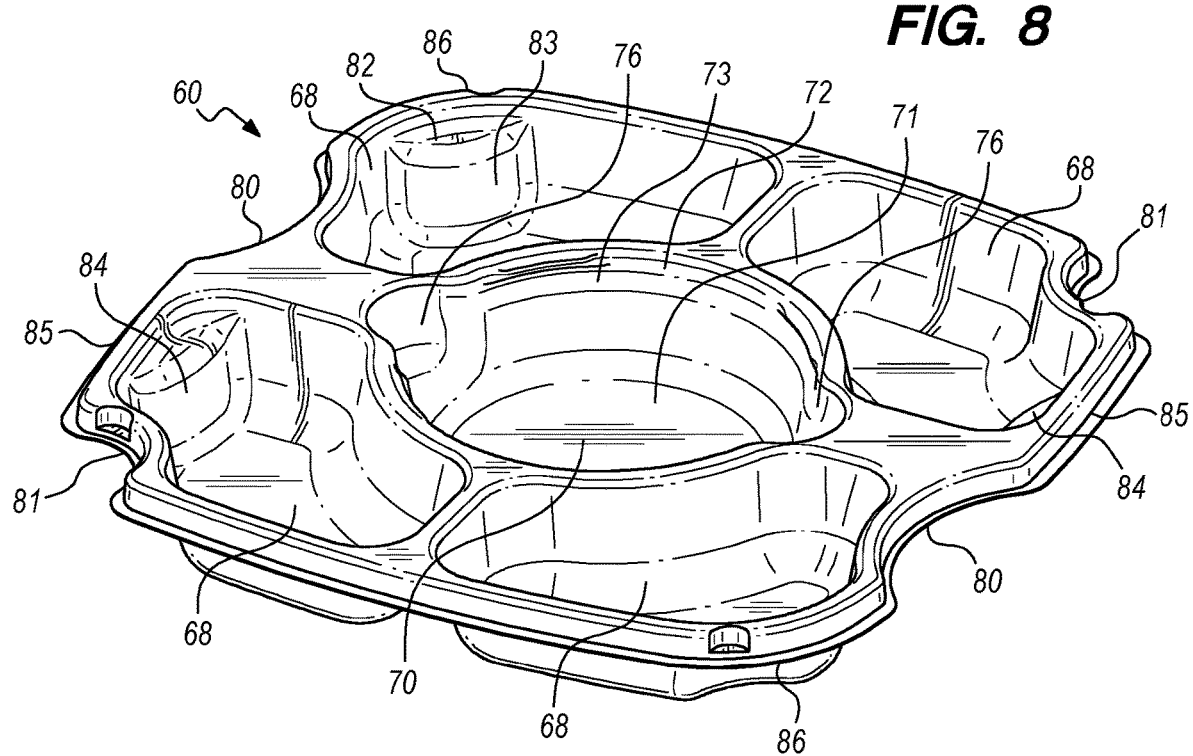
FIG. 8 is a perspective view of the top of the tray of FIGS. 1-2.
Figure 9:
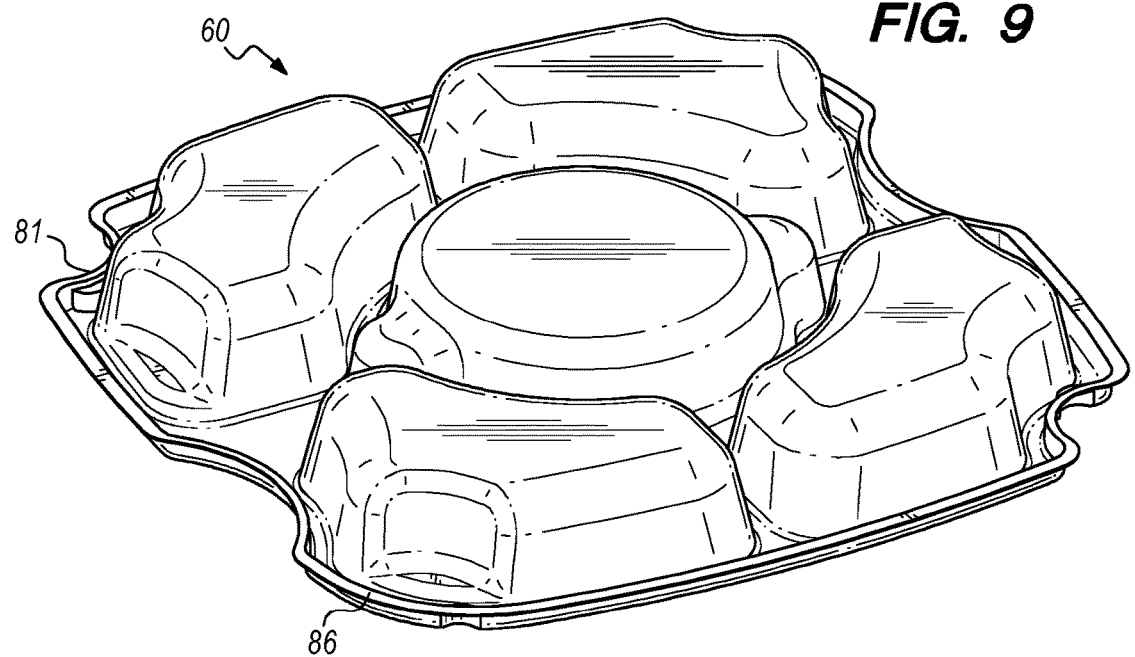
FIG. 9 is a perspective view of the bottom of the tray of FIGS. 1-2.
Figure 10:
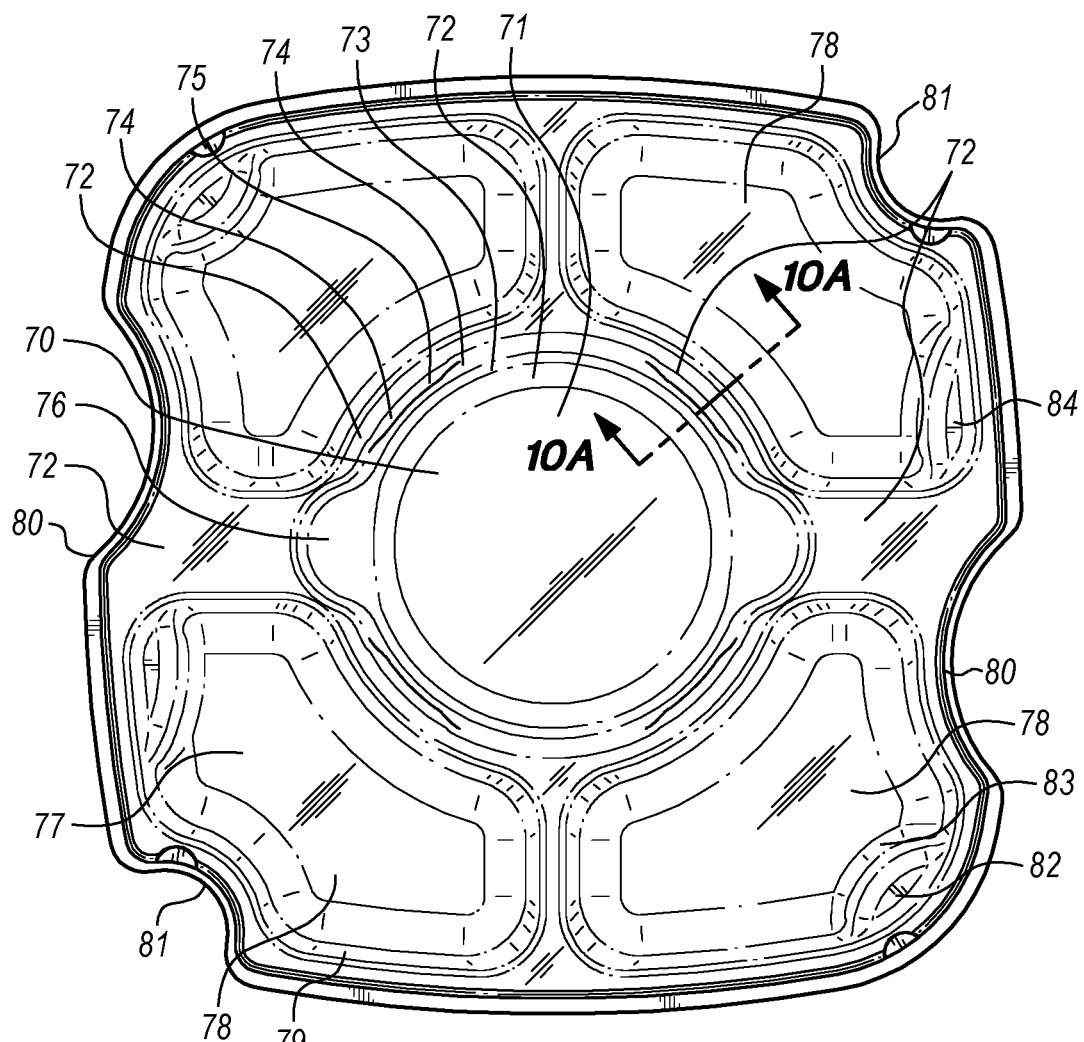
FIG. 10 is a top plan view of the tray of FIGS. 1-2.
Figure 10A:
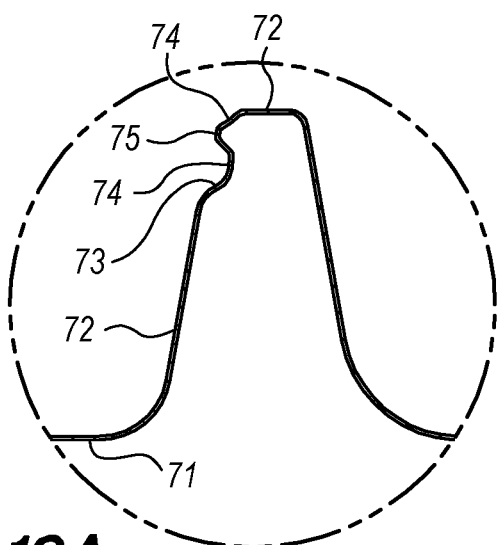
FIG. 10A is a cross-section taken along the line 10A-10A in FIG. 10.
Figure 11:
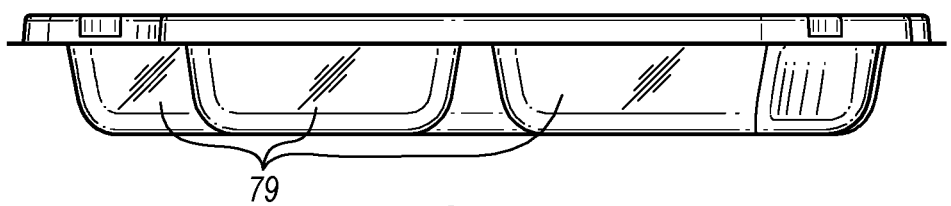
FIG. 11 is a rear elevation view of the tray of FIGS. 1-2.
Figure 12:
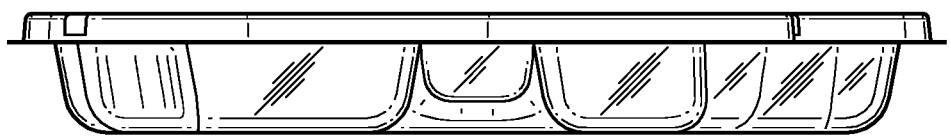
FIG. 12 is a left elevation view of the tray of FIGS. 1-2.
Figure 13:
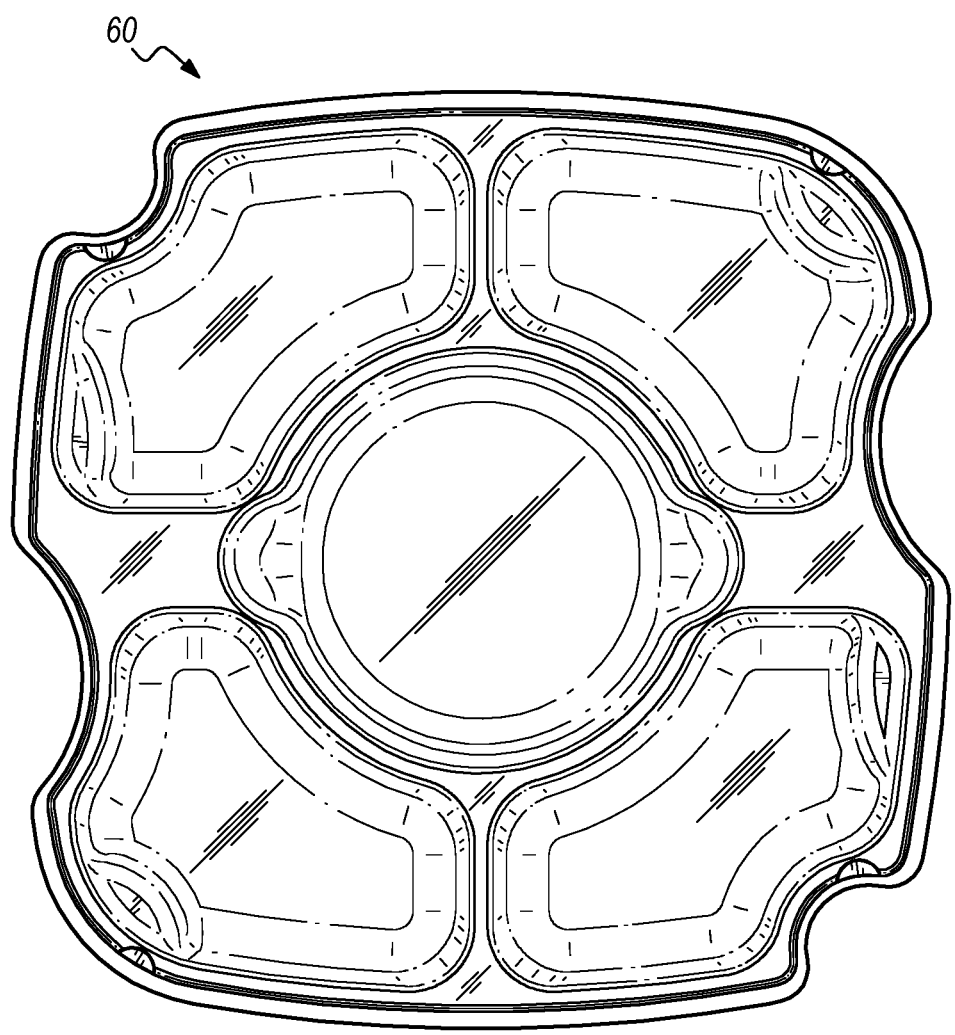
FIG. 13 is a bottom plan view of the tray of FIGS. 1-2.
Figure 14:
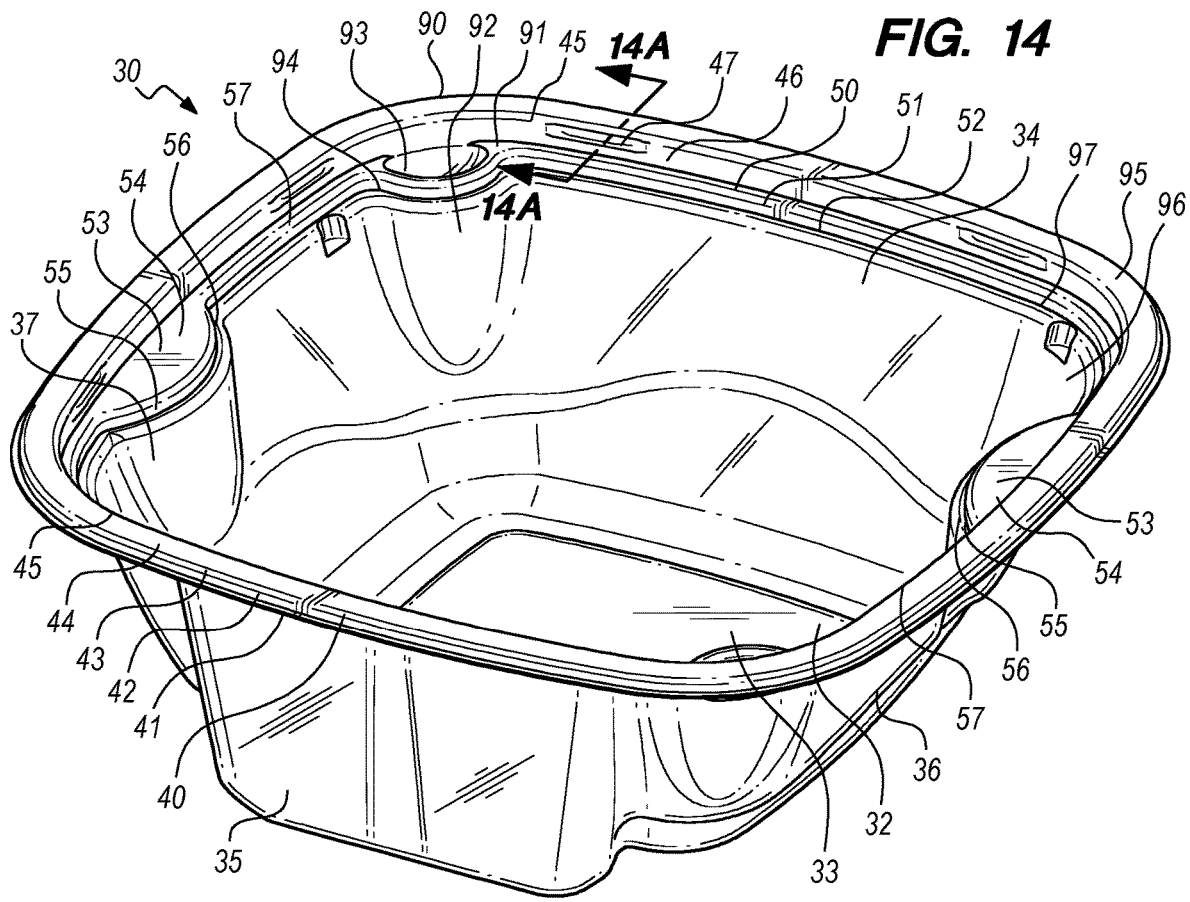
FIG. 14 is a perspective view of the top of the bowl of FIGS. 1-2.
Figure 14A:
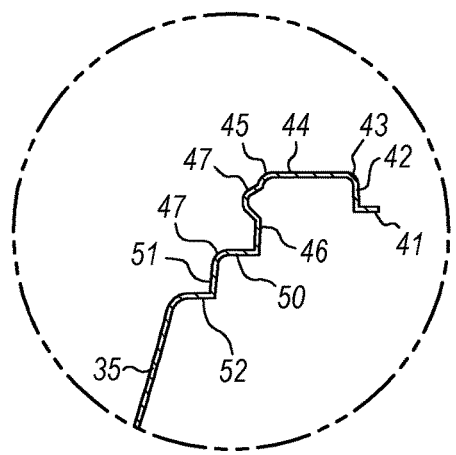
FIG. 14A is a cross-section taken along the line 14A-14A in FIG. 14.
Figure 15:
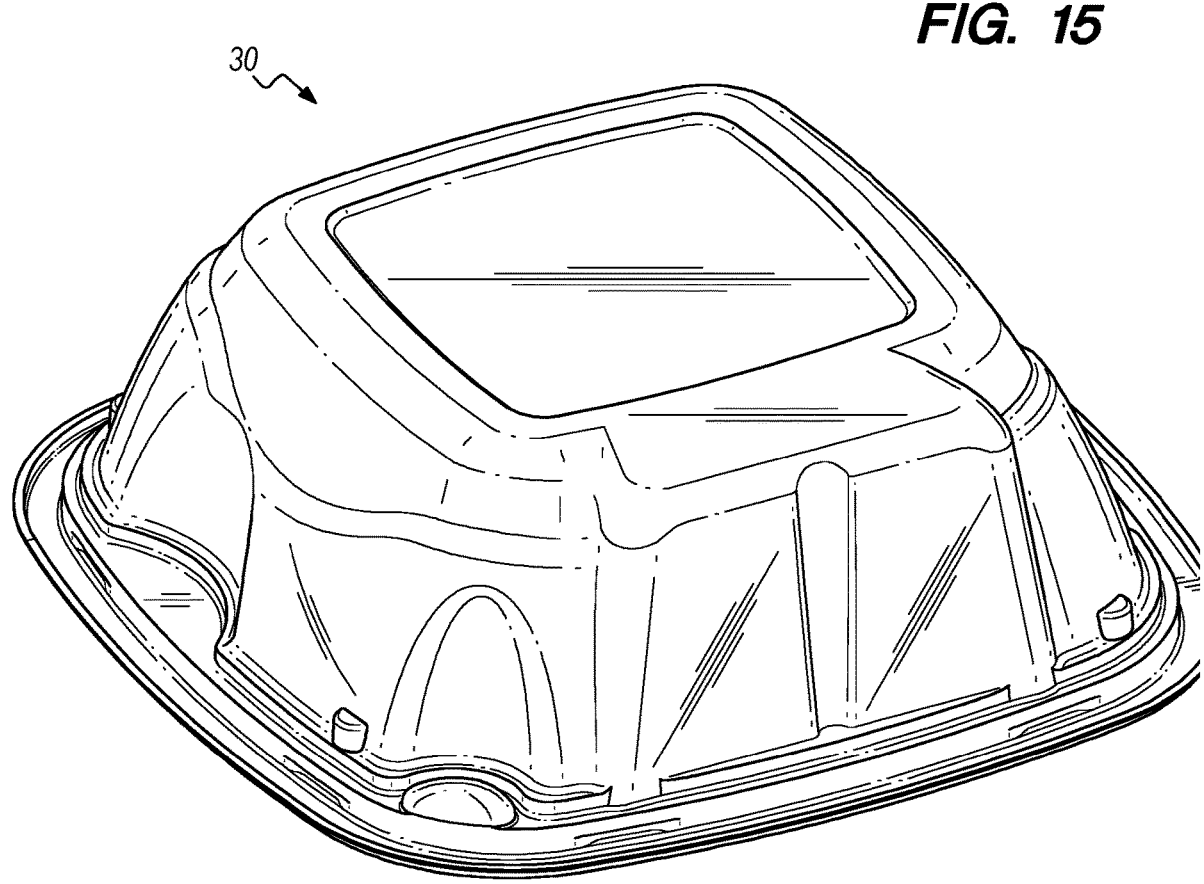
FIG. 15 is a perspective view of the bottom of the bowl of FIGS. 1-2.
Figure 16:
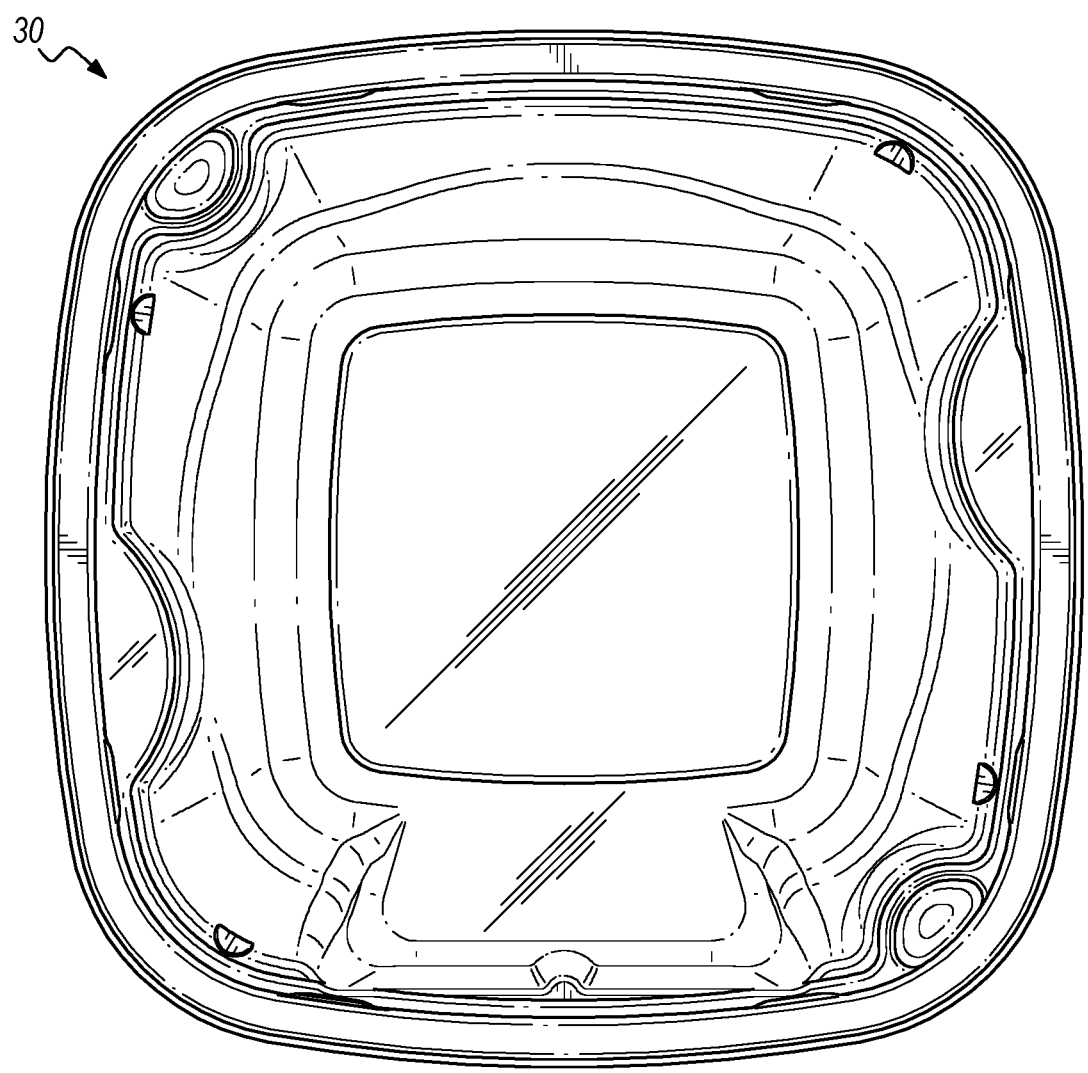
FIG. 16 is a top plan view of the bowl of FIGS. 1-2.
Figure 17:
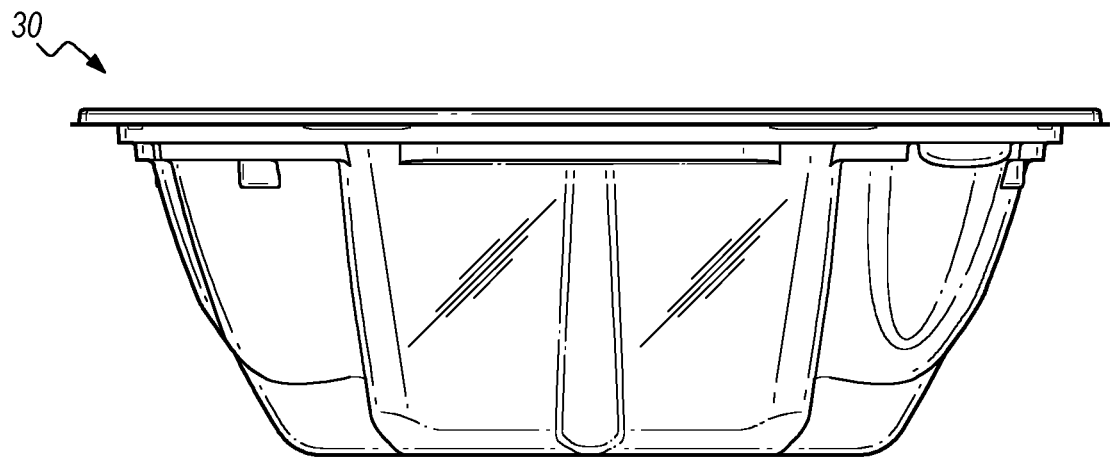
FIG. 17 is a rear elevation view of the bowl of FIGS. 1-2.
Figure 18:
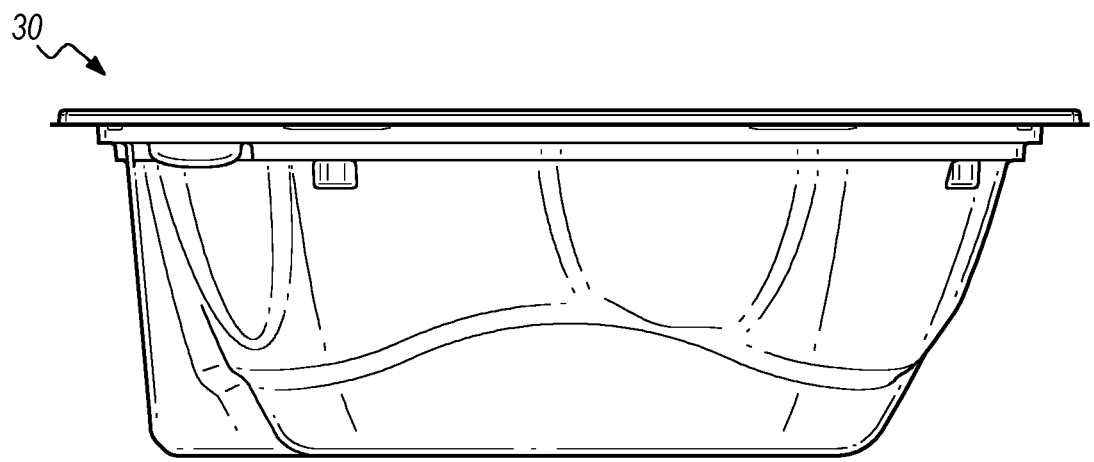
FIG. 18 is a left elevation view of the bowl of FIGS. 1-2.
Figure 19:
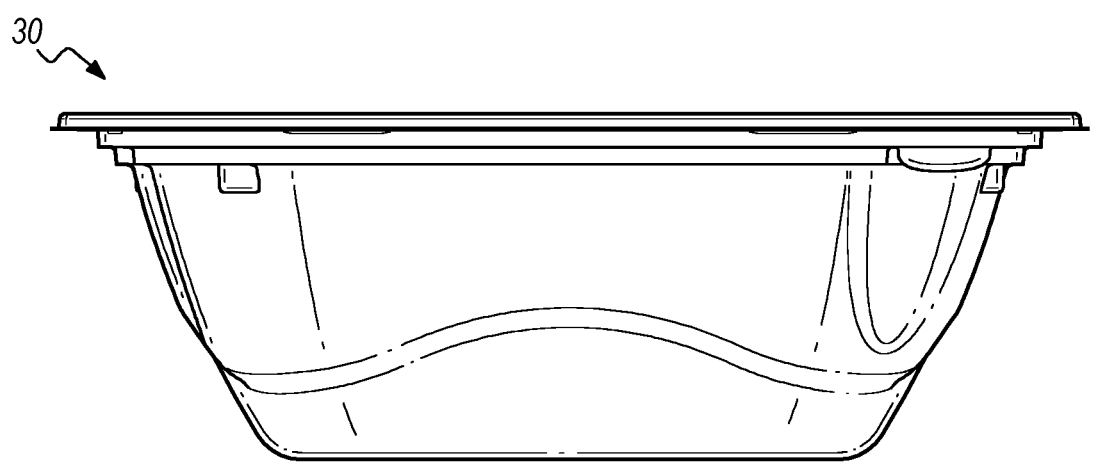
FIG. 19 is a front elevation view of the bowl of FIGS. 1-2.
Figure 20:
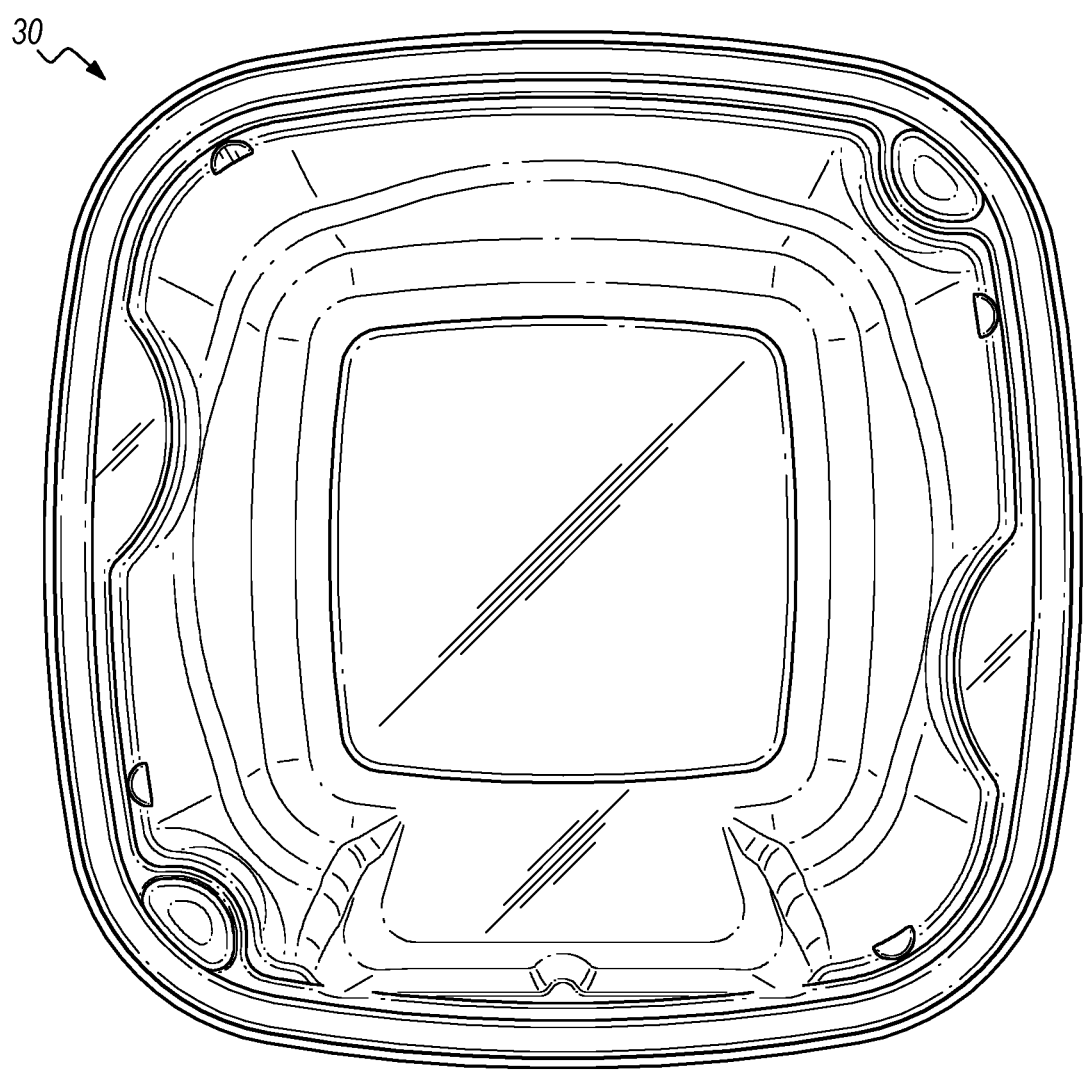
FIG. 20 is a bottom plan view of the bowl of FIGS. 1-2.

As previously explained, the vented salad container 10 might be offered at point of purchase to a consumer, while the sealed container 110 might be used to mix the salad together before eating. In the vented salad container 10, the tray 60 is mounted on the bowl 30 in a first position (shown in FIGS. 1 and 1A), with the tray outside flange 61 adjacent to the upper peripheral support shelf 50, and with the tray side cutout 80 offset from the bowl side support protrusion 53 (forming a side vent 15) and/or with the tray edge corner cutout 81 offset from the support corner 90 (forming a corner vent 14). The term "adjacent" as used herein means near or touching with no intermediate structure in between, even if a slight gap is present.

Figure 21:
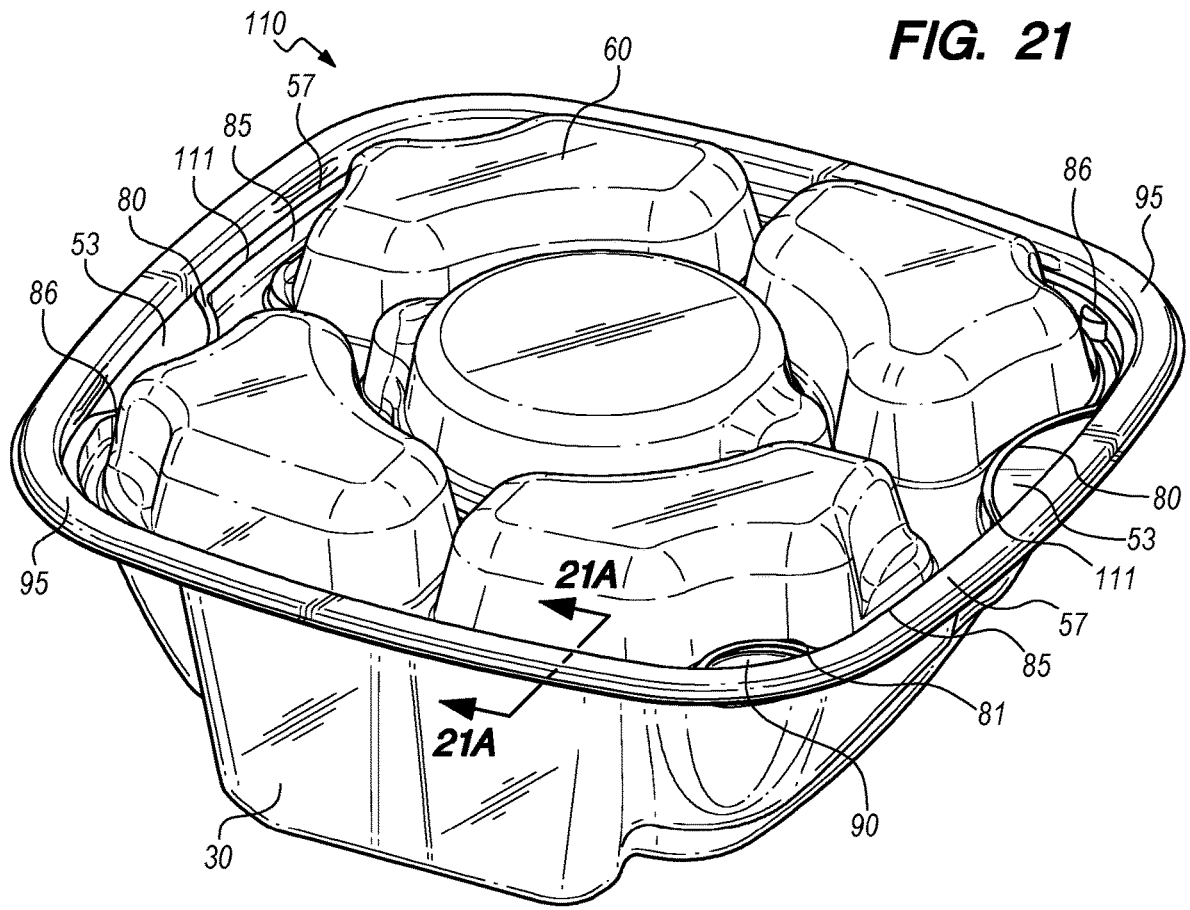
FIG. 21 is a perspective view of the top of the salad kit container of FIGS. 1-2, with the tray mounted on the bowl in the second orientation, or mix position.
Figure 21A:
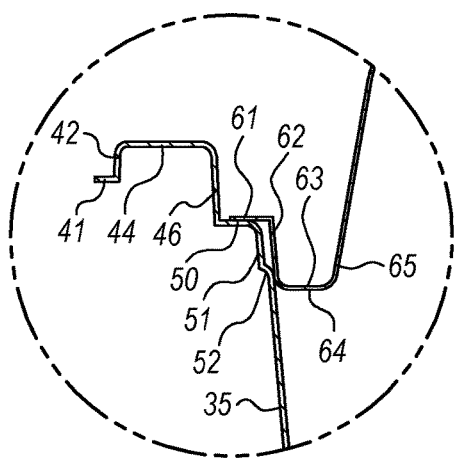
FIG. 21A is a cross-section taken along the line 21A-21A in FIG. 21.
Figure 22:
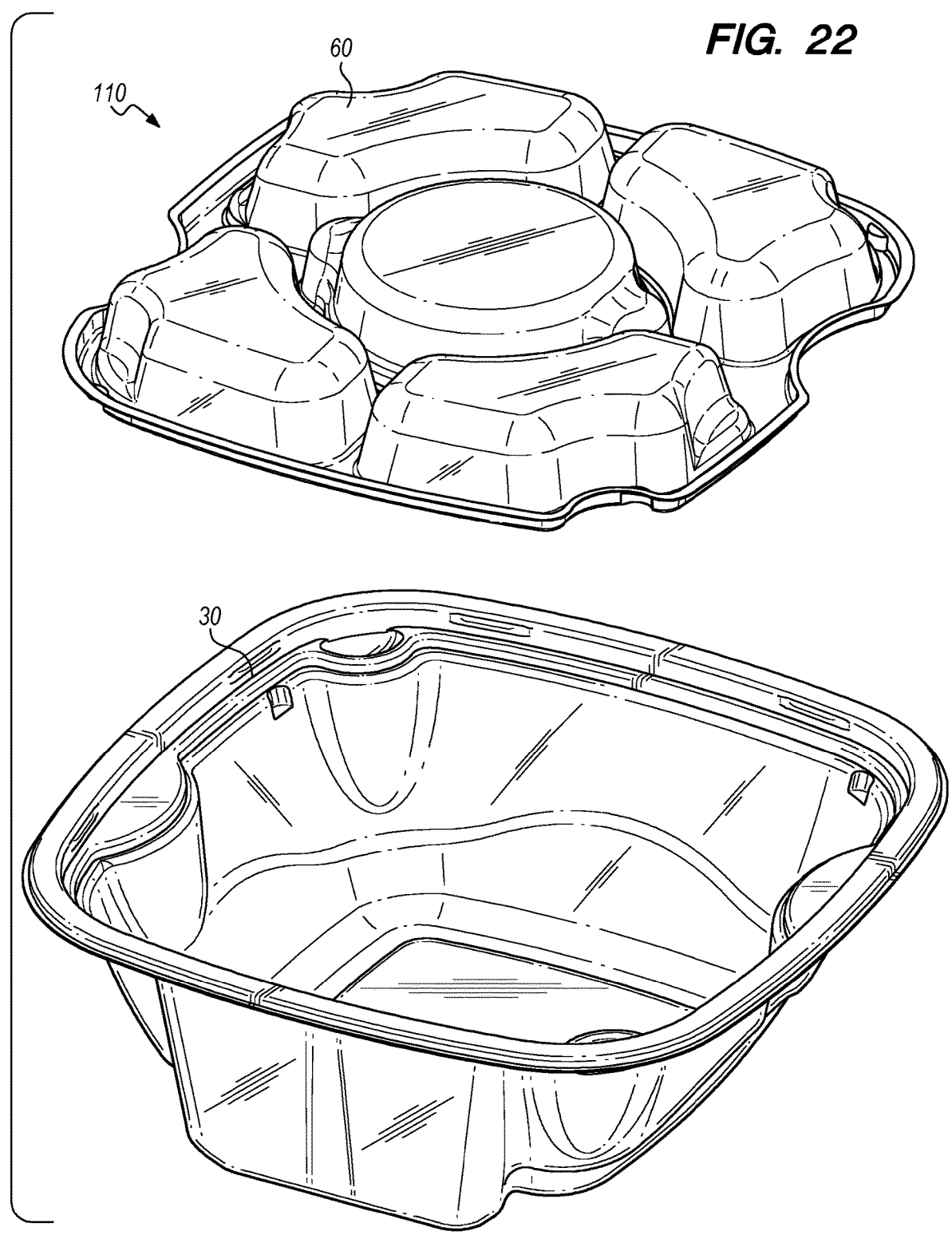
FIG. 22 is the perspective view of the salad kit container of FIG. 21 with the tray exploded from the base in the second orientation, or mix position.
Figure 23:
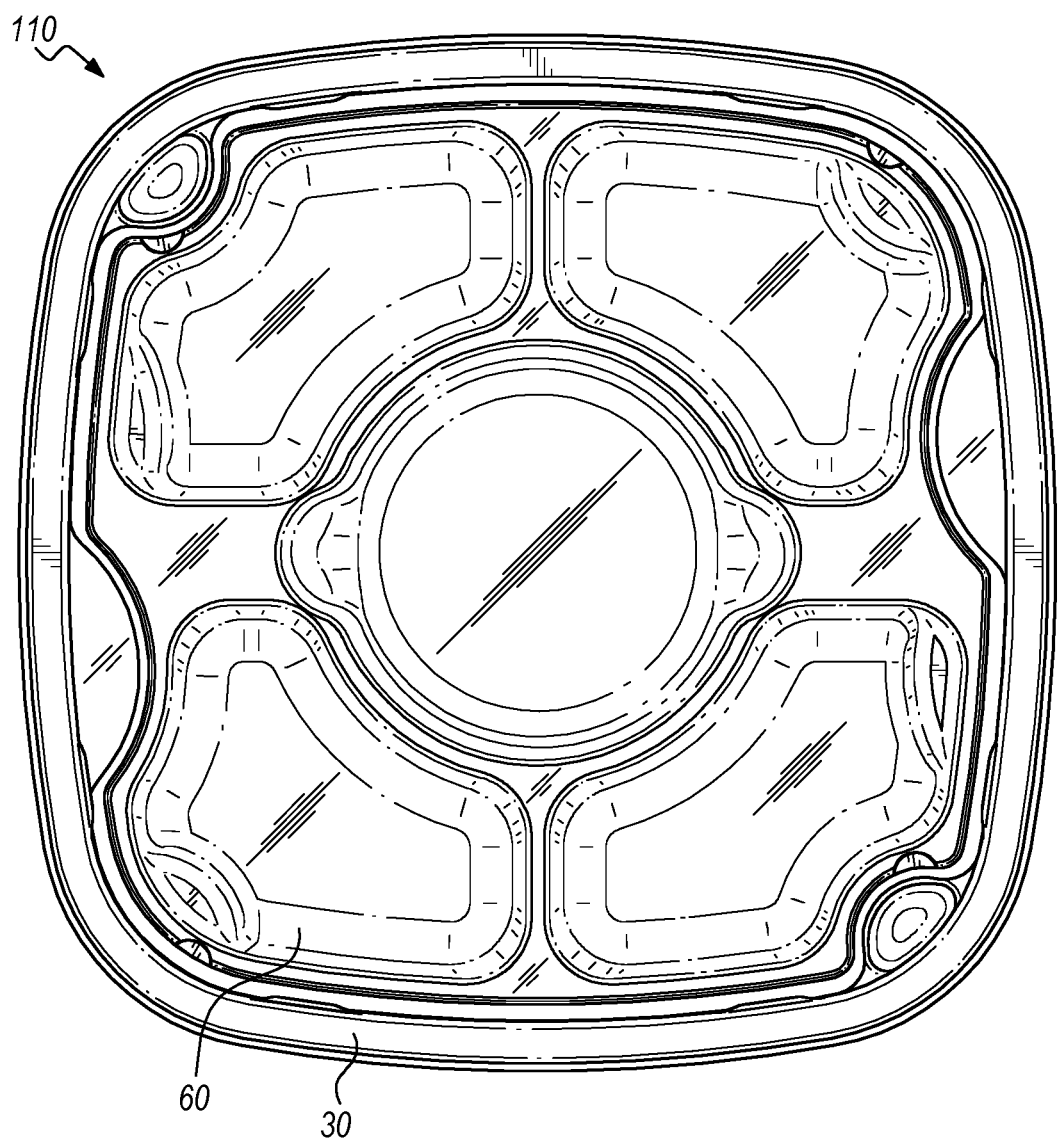
FIG. 23 is a top plan view of the salad kit container in mix position of FIG. 21.
Figure 24:
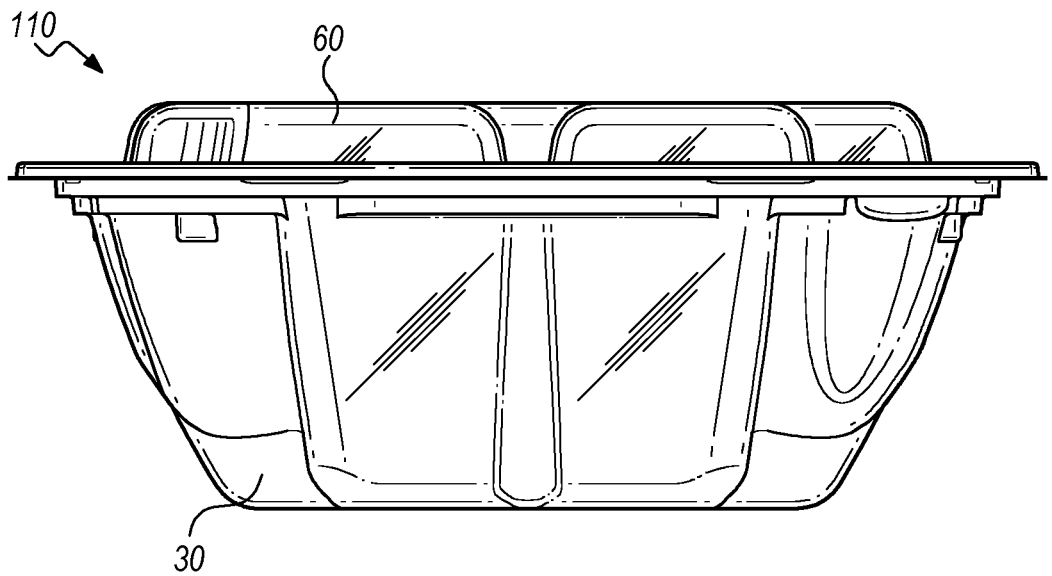
FIG. 24 is a rear elevation view of the salad kit container in mix position of FIG. 21.
Figure 25:
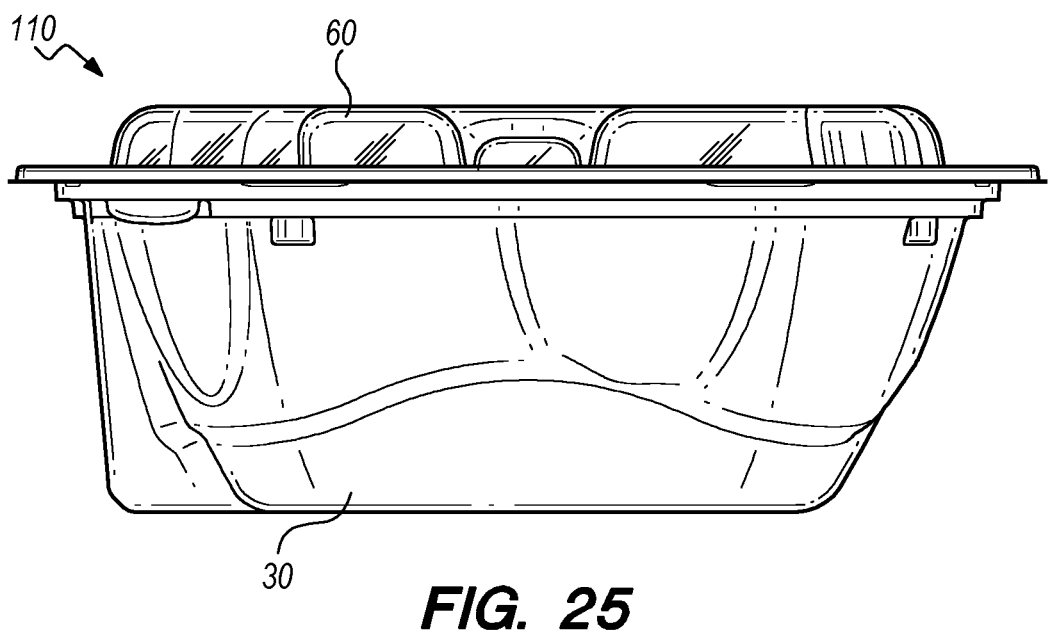
FIG. 25 is a left elevation of the salad kit container in mix position of FIG. 21.
Figure 26:
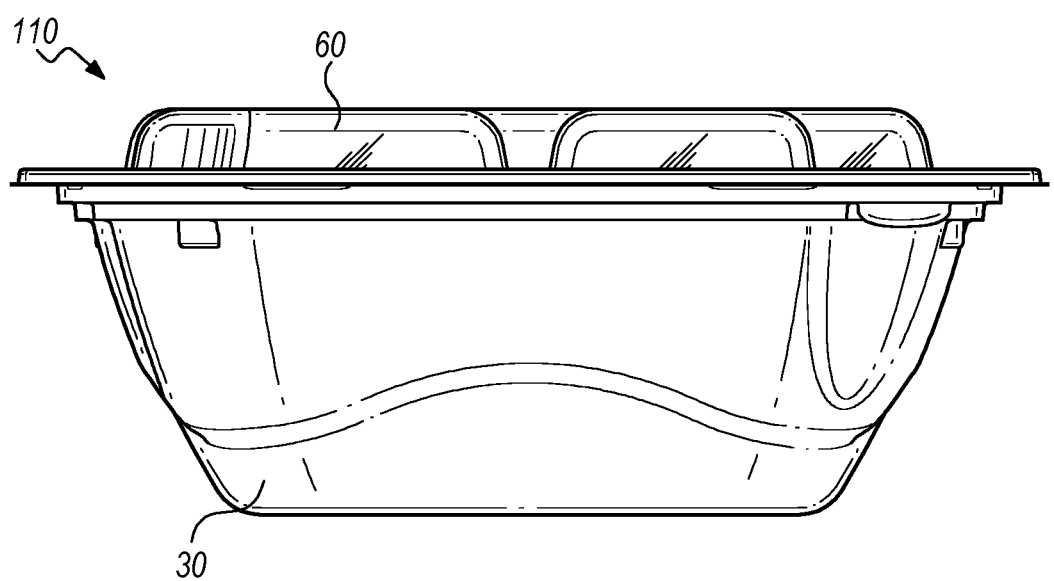
FIG. 26 is a front elevation of the salad kit container in mix position of FIG. 21.

In the sealed salad container 110, the tray 60 is mounted on the bowl 30 in a second position (shown in FIGS. 21 and 21A), with the tray edge top surface 64 adjacent the lower peripheral support shelf 52, and with the tray side cutout 80 adjacent to and nested with the bowl side support protrusion 53 and/or with the tray edge corner cutout 81 adjacent to the support corner 90.

FIGS. 21-26 show the sealed salad container 110 having a substantially sealed periphery 111.

FIG. 27 is a front elevation of a complete salad kit 210 comprising the vented salad container 10 loaded with salad greens 212 in the bowl 30, salad dressing 213 in the dressing cavity 70, and various salad fixings 214 in the fixings cavities 77. Transparent or opaque film 215 can be used over the dressing cavity 70 and/or fixings cavities 77 to seal the contents of those areas. The complete salad kit 210 may include an opaque or transparent outer sleeve 211, for example made of printed cardboard. The sleeve 211 may include windows cut to expose contents of the complete salad kit 210 and/or may bear branding, nutrition, expiration, ingredients, or other information about the product, such as Universal Product Codes ("UPC").

While the exemplary bowl 30 has a single central cavity 32, this is not required and a greater or fewer number of compartments could be used. Similarly, the exemplary tray 60 has a single dressing cavity 70 and four fixings cavities 77, this is not required and a greater or fewer number of compartments could be used. For example, the bowl 30 could have more than one cavity and/or the tray 60 could have different number of cavities for particular applications, or they could be different sizes or shapes. The container as a whole or either the bowl 30 or the tray 60 could have different sizes and/or shapes.

The bowl 30 and tray 60 are preferably made using thermoforming methods, from a suitable thermoformable material, such as a thermoformable plastic such as oriented polystyrene (OPS), talc-filled polypropylene (TFPP), polypropylene (PP), high impact polystyrene (HIPS), polyethylene terepthalate (PET), amorphous PET (APET), crystalline polyethylene (CPET) polystyrene copolymer blends, styrene block copolymer blends, and the like. The material is not necessarily homogeneous, but may be, for example, a laminate, co-extruded material, or multilayer material.

The bowl 30 and tray 60 may be made of different materials. For example, the tray 60 may be made of transparent material to allow viewing of the contents of the tray cavities 68 and/or the bowl 30, while using an opaque material for all or portions of the bowl 30 (or vice-versa).

While the vented container 10 and sealed container 110 have been described in context of salad kits, this is not required and notwithstanding the use of the term "salad", the containers 10 and 110 according to the invention could be used for other purposes. For example, a package according to the invention could be used for other food products, such as hot chicken wings in the bowl and vegetables (like celery and carrots) and sauce for the wings in the tray, or hot liquid soup in the bowl and vegetables in the tray. The tray could contain an instant hot or cold pack, with the package sold in sealed condition and then moved to the vented condition before activating the thermal device to warm or cool the contents of the bowl.

It is understood that the invention is not confined to the embodiments set forth herein as illustrative, but embraces all such forms thereof that come within the scope of the following claims.

What is claimed is:

1. A thermoformed container comprising:
  a bowl having a central cavity formed by one or more walls, at least one wall having a bowl side support protrusion and a bowl side vent section, and having a bowl upper peripheral support shelf and a bowl lower peripheral shelf;
  a tray having a central portion bearing at least one fixings cavity and having one or more edges, at least one edge having a tray side cutout and a tray edge support portion, and having a tray outside flange and a tray edge top surface;
  wherein the tray is mountable on the bowl in a first orientation with the tray outside flange adjacent to the bowl upper peripheral shelf and with the tray edge top surface not adjacent to the bowl lower peripheral shelf and with the tray side cutout positioned adjacent to the bowl side vent section and with the tray edge support portion positioned adjacent to the bowl side support protrusion, thereby forming a vented container; and
  wherein the tray is mountable on the bowl in a second orientation reached by inverting the tray from the first orientation relative to the bowl with the tray outside flange adjacent to the bowl upper peripheral shelf and with the tray edge top surface adjacent to the bowl lower peripheral shelf and with the tray side cutout positioned adjacent to the bowl side support protrusion and with the tray edge support portion positioned adjacent to the bowl side vent section, thereby forming a substantially sealed container.

2. The container of claim 1 wherein the bowl has a bowl rim top surface, and a bowl inner wall extending from the bowl rim top surface to the bowl upper peripheral support shelf, wherein the bowl inner wall bears one or more bowl rim inner wall bumps, and wherein the tray outside flange is nested between at least one bowl rim inner wall bump, at least a portion of the bowl inner wall, and at least a portion of the bowl upper peripheral support shelf when the tray is mounted on the bowl in the first orientation.

3. The container of claim 1 wherein the tray includes at least one dressing cavity.

4. A thermoformed container comprising:
  a bowl having a central cavity formed by one or more walls that meet in at least one bowl vent corner and at least one bowl support corner;
  a tray having a central portion bearing at least one fixings cavity and having one or more edges, at least one edge having a tray cutout corner and at least one edge having a tray support corner;
  wherein the tray is mountable on the bowl in a first orientation with the tray cutout corner positioned adjacent to the bowl vent corner and with the tray support corner positioned adjacent to the bowl support corner, thereby forming a vented container;
  wherein the tray is mountable on the bowl in a second orientation with the tray cutout corner positioned adjacent to the bowl support corner and with the tray support corner positioned adjacent to the bowl vent corner, thereby forming a substantially sealed container;
  wherein the tray has a tray edge top surface and wherein the bowl has a bowl lower peripheral support shelf, and wherein at least a portion of the tray edge top surface is positioned adjacent to at least a portion of the bowl lower peripheral support shelf when the tray is mounted on the bowl in the second orientation.

5. A thermoformed container comprising:
  a bowl having a central cavity formed by one or more walls that meet in at least one bowl vent corner and at least one bowl support corner;
  a tray having a central portion bearing at least one fixings cavity and having one or more edges, at least one edge having a tray cutout corner and at least one edge having a tray support corner;
  wherein the tray is mountable on the bowl in a first orientation with the tray cutout corner positioned adjacent to the bowl vent corner and with the tray support corner positioned adjacent to the bowl support corner, thereby forming a vented container;
  wherein the tray is mountable on the bowl in a second orientation with the tray cutout corner positioned adjacent to the bowl support corner and with the tray support corner positioned adjacent to the bowl vent corner, thereby forming a substantially sealed container;
  wherein the tray has a tray edge top surface and a tray outside flange, and the bowl has a bowl upper peripheral shelf and a bowl lower peripheral shelf and wherein the second orientation with the tray outside flange adjacent to the bowl upper peripheral shelf and with the tray edge top surface not adjacent to the bowl lower peripheral shelf is reached by inverting the tray from the first orientation with the tray outside flange adjacent to the bowl upper peripheral shelf and with the tray edge top surface adjacent to the bowl lower peripheral shelf.

6. A thermoformed container comprising:

a bowl having a central cavity formed by one or more walls that meet in at least one bowl vent corner and at least one bowl support corner;

a tray having a central portion bearing at least one fixings cavity and having one or more edges, at least one edge having a tray cutout corner and at least one edge having a tray support corner;

wherein the tray is mountable on the bowl in a first orientation with the tray cutout corner positioned adjacent to the bowl vent corner and with the tray support corner positioned adjacent to the bowl support corner, thereby forming a vented container;

wherein the tray is mountable on the bowl in a second orientation with the tray cutout corner positioned adjacent to the bowl support corner and with the tray support corner positioned adjacent to the bowl vent corner, thereby forming a substantially sealed container;

wherein the tray has a tray edge top surface and a tray outside flange, and the bowl has a bowl upper peripheral shelf and a bowl lower peripheral shelf and wherein the second orientation with the tray outside flange adjacent to the bowl upper peripheral shelf and with the tray edge top surface not adjacent to the bowl lower peripheral shelf is reached by inverting and rotating the tray from the first orientation with the tray outside flange adjacent to the bowl upper peripheral shelf and with the tray edge top surface adjacent to the bowl lower peripheral shelf.

7. A salad kit comprising:

a bowl made of thermoformed plastic and having a central cavity formed by one or more walls, with salad greens in the central cavity, wherein at least one wall of the bowl has a bowl side support protrusion and a bowl side vent section, and having a bowl upper peripheral support shelf and a bowl lower peripheral shelf; and a tray made of thermoformed plastic having one or more fixings cavities containing at least one salad fixing wherein the tray has one or more edges, at least one edge having a tray side cutout and a tray edge support portion, and having a tray outside flange and a tray edge top surface;

wherein the tray is mountable on the bowl in a first orientation with the tray outside flange adjacent to the bowl upper peripheral shelf and with the tray edge top surface not adjacent to the bowl lower peripheral shelf and with the tray side cutout positioned adjacent to the bowl side vent section and with the tray edge support portion positioned adjacent to the bowl side support protrusion to form a vented container;

wherein the tray is mountable on the bowl in a second orientation with the tray outside flange adjacent to the bowl upper peripheral shelf and with the tray edge top surface adjacent to the bowl lower peripheral shelf and with the tray side cutout positioned adjacent to the bowl side support protrusion and with the tray edge support portion positioned adjacent to the bowl side vent section to form a substantially sealed container; and wherein the second orientation is reached by inverting the tray relative to the bowl from the first orientation.

8. The salad kit of claim 7 wherein the bowl has at least one bowl vent corner and at least one bowl support corner;

wherein the tray has at least one tray cutout corner and at least one tray support corner;

wherein the tray is mountable on the bowl in the first orientation with the tray cutout corner positioned adjacent to the bowl vent corner and with the tray support corner positioned adjacent to the bowl support corner; and wherein the tray is mountable on the bowl in the second orientation with the tray cutout corner positioned adjacent to the bowl support corner and with the tray support corner positioned adjacent to the bowl vent corner.

9. A method of retail sales of salad kits comprising:

a retailer providing a salad kit comprising a bowl made of thermoformed plastic and having a central cavity formed by one or more walls, with salad greens in the central cavity, and having a bowl upper peripheral support shelf and a bowl lower peripheral shelf; and a tray made of thermoformed plastic having one or more fixings cavities containing at least one salad fixing and having a tray outside flange and a tray edge top surface; and the retailer mounting the tray on the bowl in a first orientation with the tray outside flange adjacent to the bowl upper peripheral shelf and with the tray edge top surface not adjacent to the bowl lower peripheral shelf to form a vented container; and the retailer selling the salad kit to a consumer, wherein the consumer empties the one or more fixings into the bowl and mounts the tray on the bowl in a second orientation reached by inverting the tray from the first orientation relative to the bowl to place the tray outside flange adjacent to the bowl upper peripheral shelf and with the tray edge top surface adjacent to the bowl lower peripheral shelf to form a substantially sealed container.

10. The method of claim 9 wherein at least one wall of the bowl has a bowl side support protrusion and a bowl side vent section;

wherein the tray has one or more edges, at least one edge having a tray side cutout and a tray edge support portion; and wherein the tray is mounted on the bowl in the first orientation with the tray side cutout positioned adjacent to the bowl side vent section and with the tray edge support portion positioned adjacent to the bowl side support protrusion; and wherein the tray is mounted on the bowl in the second orientation with the tray side cutout positioned adjacent to the bowl side support protrusion and with the tray edge support portion positioned adjacent to the bowl side vent section.

11. The method of claim 9 wherein the bowl has at least one bowl vent corner and at least one bowl support corner;

wherein the tray has at least one tray cutout corner and at least one tray support corner;

wherein the tray is mounted on the bowl in the first orientation with the tray cutout corner positioned adjacent to the bowl vent corner and with the tray support corner positioned adjacent to the bowl support corner; and wherein the tray is mounted on the bowl in the second orientation with the tray cutout corner positioned adjacent to the bowl support corner and with the tray support corner positioned adjacent to the bowl vent corner.

12. A thermoformed container comprising:
a bowl having a central cavity formed by one or more walls that meet in at least one bowl vent corner and at least one bowl support corner, and having a bowl upper peripheral support shelf and a bowl lower peripheral shelf;
a tray having a central portion bearing at least one fixings cavity and having one or more edges, at least one edge having a tray cutout corner and at least one edge having a tray support corner, and having a tray outside flange and a tray edge top surface;
wherein the tray is mountable on the bowl in a first orientation with the tray outside flange adjacent to the bowl upper peripheral shelf and with the tray edge top surface not adjacent to the bowl lower peripheral shelf and with the tray cutout corner adjacent to the bowl vent corner and with the tray support corner adjacent to the bowl support corner, thereby forming a vented container; and
wherein the tray is mountable on the bowl in a second orientation reached by inverting the tray from the first orientation relative to the bowl with the tray outside flange adjacent to the bowl upper peripheral shelf and with the tray edge top surface adjacent to the bowl lower peripheral shelf and with the tray cutout corner positioned adjacent to the bowl support corner and with the tray support corner positioned adjacent to the bowl vent corner, thereby forming a substantially sealed container.

13. The container of claim 12 wherein the bowl has a bowl rim top surface, and a bowl inner wall extending from the bowl rim top surface to a bowl upper peripheral support shelf, wherein the bowl inner wall bears one or more bowl rim inner wall bumps, and wherein the tray outside flange is nested between at least one bowl rim inner wall bump, at least a portion of the bowl inner wall, and at least a portion of the bowl upper peripheral support shelf when the tray is mounted on the bowl in the first orientation.

14. The container of claim 12 wherein the tray has a tray edge top surface and wherein the bowl has a bowl lower peripheral support shelf, and wherein at least a portion of the tray edge top surface is positioned adjacent to at least a portion of the bowl lower peripheral support shelf when the tray is mounted on the bowl in the second orientation.

15. The container of claim 12 wherein the tray includes at least one dressing cavity.

16. A thermoformed container comprising:
a bowl having a central cavity formed by one or more walls that meet in at least one bowl vent corner and at least one bowl support corner;
a tray having a central portion bearing at least one fixings cavity and having one or more edges that meet at a tray cutout corner and tray support corner;
wherein the tray is mountable on the bowl in a first orientation with the tray cutout corner positioned adjacent to the bowl vent corner and with the tray support corner positioned adjacent to the bowl support corner, thereby forming a vented container;
wherein the tray is mountable on the bowl in a second orientation with the tray cutout corner positioned adjacent to the bowl support corner and with the tray support corner positioned adjacent to the bowl vent corner, thereby forming a substantially sealed container; and
wherein the tray has a tray edge top surface and wherein the bowl has a bowl lower peripheral support shelf, and wherein at least a portion of the tray edge top surface is positioned adjacent to at least a portion of the bowl lower peripheral support shelf when the tray is mounted on the bowl in the second orientation.

17. The container of claim 16 wherein the tray includes at least one dressing cavity.

\* \* \* \* \*